United States Patent
Chan

(10) Patent No.: US 12,437,259 B2
(45) Date of Patent: Oct. 7, 2025

(54) MULTIPLE ZONE-BASED TRIGGERING SYSTEM AND METHOD

(71) Applicant: Oliver SzeShing Chan, Grapevine, TX (US)

(72) Inventor: Oliver SzeShing Chan, Grapevine, TX (US)

( * ) Notice: Subject to any disclaimer, the term of this patent is extended or adjusted under 35 U.S.C. 154(b) by 258 days.

(21) Appl. No.: 17/954,308

(22) Filed: Sep. 27, 2022

(65) Prior Publication Data

US 2023/0111458 A1 Apr. 13, 2023

Related U.S. Application Data

(60) Provisional application No. 63/402,979, filed on Sep. 1, 2022, provisional application No. 63/249,389, filed on Sep. 28, 2021.

(51) Int. Cl.
*G06Q 10/087* (2023.01)

(52) U.S. Cl.
CPC .................. *G06Q 10/087* (2013.01)

(58) Field of Classification Search
CPC .......................... G06Q 10/087; G06Q 10/0836
USPC ........................................................ 705/28
See application file for complete search history.

(56) References Cited

U.S. PATENT DOCUMENTS

| | | |
|---|---|---|
| 8,489,112 B2 | 7/2013 | Roeding |
| 9,965,814 B2 | 5/2018 | Becker |
| 10,304,147 B2 | 5/2019 | Kelly |
| 10,319,013 B2 | 6/2019 | Moring |
| 10,402,920 B2 | 9/2019 | Fox |
| 10,726,472 B2 | 7/2020 | Isaacson |
| 10,929,867 B1 | 2/2021 | Joseph |
| 10,958,434 B1 * | 3/2021 | Marquardt .......... H04L 43/0817 |
| 11,122,393 B2 | 9/2021 | Hurewitz |
| 11,132,737 B2 | 9/2021 | Glaser |
| 11,288,648 B2 | 3/2022 | Glaser |

(Continued)

OTHER PUBLICATIONS

Yi, Xiujuan. Controlled Mobility for Event Data Collection within Wireless Sensor Networks. University of California, Irvine ProQuest Dissertations & Theses, 2012. (Year: 2012).*

(Continued)

*Primary Examiner* — Fawaad Haider
(74) *Attorney, Agent, or Firm* — Forsgren Fisher McCalmont DeMarea Tysver; Daniel A. Tysver; James M. Urzedowski

(57) ABSTRACT

A system and method are presented that monitor location data obtained from a heartbeat signal from user devices. The location of the user device is determined from the heartbeat signal utilizing a server. A plurality of user devices for a single user can be managed by controlling the transfer of the heartbeat signal between devices. The determined location is compared to geolocation zones for separate locations. The server communicates with processing engines at the plurality of locations to control fulfillment apparatus at the locations. The server may begin production at a plurality of fulfillment locations, which may lead to cancellation of production at a one or more non-selected locations after production has begun and the re-use of sub-products. Final production and delivery at the selected location can be locally controlled using geocells established as part of a pickup path defined at the location.

21 Claims, 10 Drawing Sheets

(56) References Cited

U.S. PATENT DOCUMENTS

| | | |
|---|---|---|
| 2014/0108497 A1* | 4/2014 | Yao .................. H04N 21/2387 |
| | | 709/203 |
| 2014/0337921 A1 | 11/2014 | Hanna, Jr. |
| 2016/0275470 A1 | 9/2016 | Straw |
| 2017/0026840 A1 | 1/2017 | Eyal |
| 2018/0075404 A1 | 3/2018 | Hendrickson |
| 2019/0140908 A1* | 5/2019 | Ma ....................... H04W 48/16 |
| 2020/0186962 A1 | 6/2020 | Moeller |
| 2020/0320528 A1* | 10/2020 | Setty ..................... H04L 63/12 |
| 2021/0256594 A1 | 8/2021 | Cartwright |

OTHER PUBLICATIONS

Gloschat, Christopher Reed. Development of High Resolution Tools for Investigating Cardiac Arrhythmia Dynamics. Washington University in St. Louis ProQuest Dissertations & Theses, 2017. (Year: 2017).*

Apr. 5, 2023 PCT Search Report (Serial No. PCT/US22/44951)—Our Matter 10465.

El Midaoui et al., "Logistics tracking system based on decentralized IoT and blockchain platform", Indonesian Journal of Electrical Engineering and Computer Science, Jul. 2021, retrieved on [Feb. 28, 2023].

* cited by examiner

MULTIPLE ZONE-BASED TRIGGERING SYSTEM AND METHOD

CROSS-REFERENCE TO RELATED CASES

The application claims the benefit of U.S. Provisional Patent Application Ser. No. 63/249,389, filed Sep. 28, 2021, and U.S. Provisional Patent Application Ser. No. 63/402,979 filed Sep. 1, 2022. Both of these applications are hereby incorporated by reference in their entireties.

FIELD OF THE INVENTION

This invention relates to the creation of a plurality of geolocation zones around a plurality of separate fulfillment locations, and to the control of interactions with the separate fulfillment locations based upon location-based data. The invention also relates to location-based heartbeat signaling, central and local processing of location data, partial completion of items at the plurality of fulfillment locations using modular equipment, and transferring of heartbeat signals between moving devices.

SUMMARY OF THE INVENTION

The systems and methods disclosed monitor location data obtained from a heartbeat signal sent by user devices. The heartbeat signal is comprised of a plurality of heartbeat tokens containing location and other data related to the user. The user may have a plurality of devices, and the systems and methods manage the transfer of the controlling heartbeat signal between devices. The location of the user devices is determined from the heartbeat signal utilizing a server. The determined location is compared to a plurality of separate geolocation zones that are defined around a plurality of separate fulfillment locations. The established zones can be based on distance or estimated time arrival, and the zones can be dynamically altered based in part on the current and past activity of the user devices and the user.

The server communicates with fulfillment location processing engines at the plurality of fulfillment locations to control fulfillment apparatus at the fulfillment locations. The fulfillment apparatus can comprise a plurality of modular equipment that produce an ordered product. Each of the modular equipment can create a sub-product that may be reusable. The server can begin production of an ordered product at a plurality of fulfillment location based on monitoring of the heartbeat signal from the user device and the interaction of the user device location and the established zones. Such monitoring may lead to cancellation of production at one or more non-selected fulfillment locations after production has begun, with final production occurring at a selected fulfillment location. Cancellation of production may occur after production of a sub-product by a modular equipment component at a cancelled fulfillment location, where the sub-product can be used in a different production for a different user.

Final production at the selected fulfillment location can be locally controlled using geocells established as part of a pickup path defined at the fulfillment location. Geocell location can occur locally using local location sensors. The movement of the user device through the geocells of the pickup path can be used to manage a product production and delivery queue, and to verify identity during delivery.

DETAILED DESCRIPTION

Overview of System 100

Figure 1:
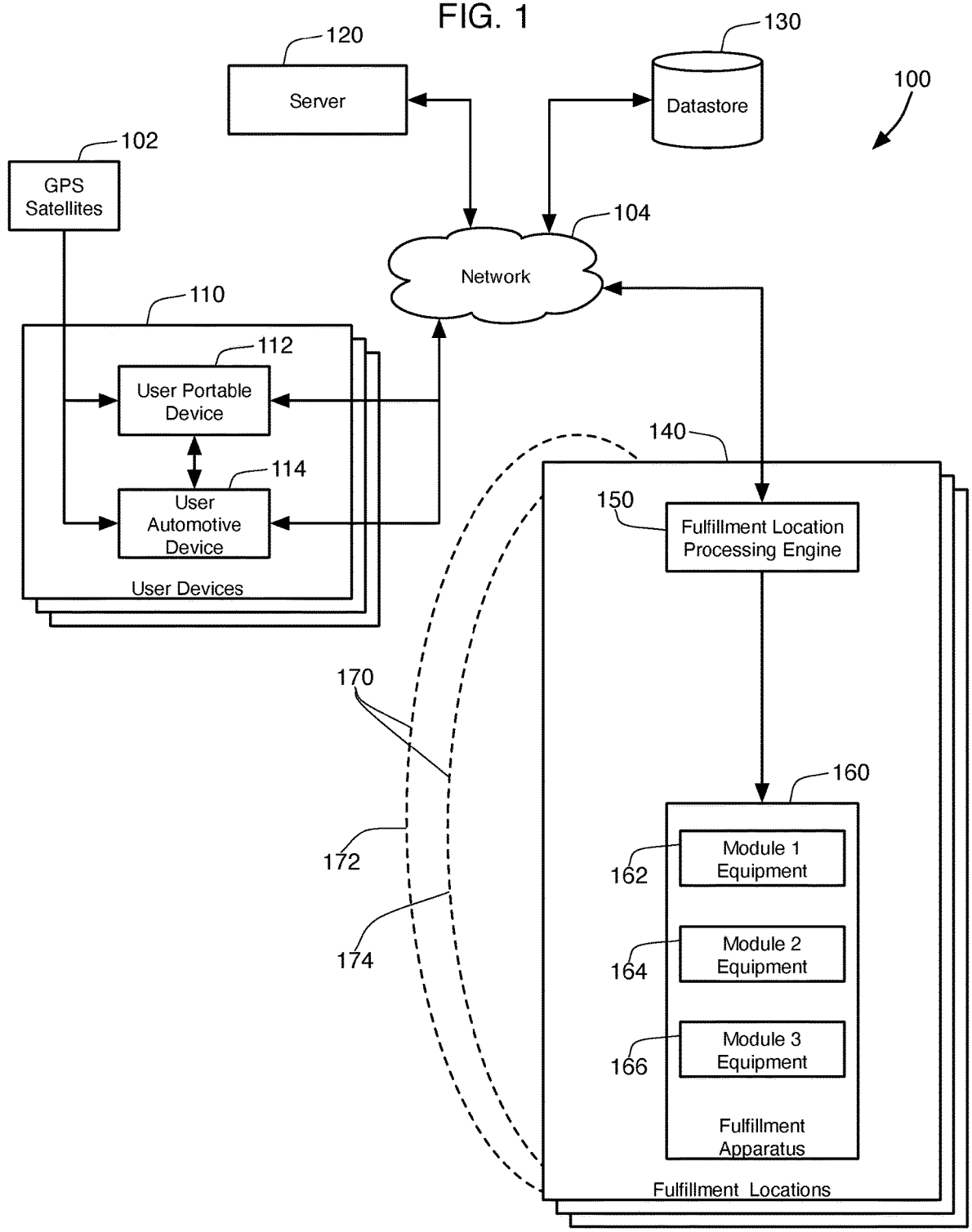
FIG. 1 is a schematic view of a first system for implementing one embodiment of the present invention.

FIG. 1 illustrates an exemplary embodiment of a dynamic order processing and fulfillment system 100 according to one embodiment. The system includes user devices 110, server 120, datastore 130, and fulfillment location processing engines 150 found at fulfillment locations 140, all communicating over a network 104. The system 100 is designed to utilize the location of the user devices 110 in the placement and fulfilment of orders at the fulfillment locations 140. The location of the user devices 110 can be identified through a variety of means, including through the use of GPS location information made possible through standard GPS satellites 102.

The network 104 can comprise a plurality of different networks or subnetworks, and can be accessed using a variety of techniques and protocols, such as through a local WiFi or Ethernet LAN, or through a cellular data network. In one embodiment, the network 104 includes the Internet.

User devices 110 can include both user portable devices 112 (such as laptop computers, smartphones, tablet computers, or other mobile devices) and automotive devices 114. Automotive devices 114 comprise computerized systems that form part of a mobile vehicle such as a car or a truck. In most cases, the user portable devices 112 and the automotive devices 114 are capable of running applications or apps programmed to perform specific functions.

Server 120 tracks user location by periodically receiving user location information from a user mobile device 112 or automotive device 114 through a heartbeat signal. A heartbeat signal comprises a data signal sent from a user device 110 to the server 120 over the network 104. The server 120 also receives user information, and in some cases order information, from the user devices 110. Server 120 also receives information over the network 104 from a plurality of fulfillment location processing engines 150 at separate fulfillment locations. Although the server 120 is shown as a single device or machine in FIG. 1, this is only a schematic illustration. In practice, the server 120 may be split over a variety of separate machines, acting independently or in concert to perform the computing activities of the server 120 as described herein.

The server 120 can store this data in the datastore 130 and retrieve previously stored data from the datastore 130.

Datastore 130 contains data relating to users of the user devices 110 and information about orders made by users to or at the fulfillment locations 140. Datastore 130 also contains information about the fulfillment locations 140, including the physical location of the fulfillment locations 140 and the type of products that can be ordered and created using any and all fulfillment apparatus 160 that may be found at each fulfilment location 140.

In some embodiments, datastore 130 is accessed as necessary by the other components of the system 100 to obtain the information necessary to create and process an order. The server 120 can operate, in part, as a data server to provide access to the datastore 130. In these embodiments, data might be requested from the datastore 130 by making a request first to the server 120, which then obtains the data and returns it to the requesting device in the system 100. In other embodiments, all components of the system 100 can directly receive data from, and store data in, the datastore 130. Although depicted as a separate, single component, datastore 130 may comprise data and data service processors found at a variety of locations. The datastore may be, for example, incorporated into the other components shown in FIG. 1, including but not limited to the server 120, the user devices 110, or the fulfillment location processing engines 150.

The datastore 130 generally includes defined database entities. These entities may constitute database tables in a relational database, or database objects in an object-oriented database, or any other type of database entity usable with a computerized database. In the present embodiment, the phrase database entity refers to data records in a database whether comprising a row in a database table, an instantiation of a database object, or any other populated database entity. Data within the datastore 130 can be "associated" with other data. This association can be implemented using a variety of techniques depending on the technology used to store and manage the database, such as through formal relationships in a relational database or through established relationships between objects in an object-oriented database.

The user devices 110, the server 120, and the fulfilment location processing engine 150 are all computing devices. That means that each device includes a processor for processing computer programming instructions. In most cases, the processor is a CPU, such as the CPU devices created by Intel Corporation (Santa Clara, CA), Advanced Micro Devices, Inc (Santa Clara, CA), or a RISC processor produced according to the designs of Arm Holdings PLC (Cambridge, England). Furthermore, these computing devices 110, 120, 150 have memory, which generally takes the form of both temporary, random-access memory (RAM) and more permanent storage such a magnetic disk storage, FLASH memory, or another non-transitory (also referred to as permanent) storage medium. The temporary memory and storage (referred to collectively as "memory") contain both programming instructions and data. In practice, both programming and data will be stored permanently on non-transitory storage devices and transferred into RAM when needed for processing or analysis.

The user devices 110 present user interfaces to users of those devices. This interface can be presented to the user of these devices 110 through a variety of known mechanisms. For instance, if the user portable device 112 is a laptop or desktop computer, the device 112 may utilize a web browser, and the interface could be presented as a webpage or website provided by a web server operating on the server 120. If the user device 112 is a mobile device such as a smartphone or tablet computer, the interface could still be presented through a web interface. Alternatively, an app could be developed that operates on the user device 112. This app could request data from the datastore 130 and could utilize that data to create the user interface using the app's own programming. It is also possible to develop a custom application that operates on a laptop or desktop user device 112 in a similar manner to an app operating on a mobile device.

A user automotive device 114 devices also present user interfaces to the user, and these interfaces can be presented in the same manner as those interfaces provided over the user portable devices 112. In most cases, however, the user automotive device 114 will be programmed so as to minimize user distraction so that the user may drive the motor vehicle while interacting with the interface. In these cases, a simplified visual interface could be presented on a built-in display found on the automotive dashboard. Audible controls are also anticipated, where user voice commands can be received by the user automotive device 114 after a visual or audible prompt is presented to the user.

In one embodiment, the system 100 defines one or more zones 170 around each of the fulfillment locations 140. The zones can be defined and maintained by the server 120 using information about the fulfillment locations 140 stored in the datastore 130. Alternatively, the zones can be defined and maintained by the fulfillment location processing engines 150 that are resident at each fulfillment location 140. In one aspect, the zones 170 define geofences, namely a specific geographic boundary which triggers some action when the defined geofence boundary is entered by one of the user devices 110.

Zones 170 do not need to be static, but they can be. A static zone might define a geographic distances from a fulfillment location 140, such as circle with a 2-mile radius centered on the fulfillment location 140. Static zones need not be defined according solely to distance, and some zones can be based upon average time to travel to the fulfillment zone. Current mapping technology can determine how long a typical individual will take to travel to a known location. This "estimated time to arrival" (or ETA) can differ based upon the mode of travel used, such as walking, biking, or driving. A zone can be based upon this typical ETA information, defining (for example) a perimeter that is five minutes from arrival at the fulfillment location 140 based upon a particular mode of travel. This type of zone would not form a circle of uniform radius but would rather be elongated along directions containing freeways traveling toward the fulfillment location 140 (where travel is much faster) and constricted along directions when travel must occur, for example, over congested, downtown streets.

Such zones based on typical ETA are still considered static, as they are consistent from user to user and do not change frequently (changing, perhaps, as traffic congestion eases, or according to upcoming mass-transit schedules). In fact, a zone based on typical ETAs does not even need to be based on actual, real-time ETA calculations, but can be estimated using past movement data or even the "best guess" of an expert made after an analysis of traffic and movement patterns around a fulfillment location 140.

Dynamic zones are also possible that are based upon information known about a particular user device 110. For instance, a particular user device 110 might be associated with a user that routinely follows a regular traffic route. Repeated errands, such as dropping off children at daycare, could be saved in the datastore 130 in association with a particular user or user device 112. The system 100 would anticipate that the user device 110 will exit a freeway two exits earlier than would otherwise be most efficient in order to perform that errand, with the remainder of the distance being driven on side-streets. The zone 170 defined for that user will differ from the same zone 170 defined for a different user who does not exit early. Such historical information about a user can be stored in the datastore 130 and be associated with elements such as time of day, day of week, day of month, month of year, public holiday, travelling direction, and speed in order to predict a dynamic zone for that particular user. Furthermore, information known about the current travel speed for the user device 110 (a fast biker vs. a slow walker) would allow the system 100 to improve its creation of a dynamic, custom-ETA based zone 170.

The system 100 in some embodiment defines multiple zones around the fulfillment location 140, including an engagement zone 172 and a production zone 174. The engagement zone 172 is generally the larger zone 170. In these embodiments, a server 120 that determines that a user device 110 has entered an engagement zone 172 or a production zone 174 will communicate this information to the corresponding fulfillment location processing engine 150. In response to this communication, the fulfillment location processing engine 150 will perform specific functions based upon the zone 170 entered by the user device 110.

In one embodiment, server 120 performs functions associated with automated ordering in the absence of an order being placed by a user. Server 120 uses at least one of user order history, user preferences, and location tracking information to automatically submit an order for a product without requiring a user to initiate the ordering process. In these embodiments, a user device 110 entering the larger engagement zone 172 can trigger an order submission by the server 120 to the appropriate fulfillment location 140. Entering the smaller production zone 174 will trigger an instruction to the fulfillment location 140 to start the fulfillment apparatus 160 to begin production of an ordered product so that the user's order is ready when the user arrives. Note that the current description refers to the order and creation of a "product." While a physical product can be ordered by the system 100 and produced by the fulfillment apparatus 160, the product may also take the form an intangible product or a service. These types of products may also require preparation, such as the heating of oil for a massage, or the preparation of workout room for an exercise session.

In one embodiment, size of the zones 170 vary depending on the product included in the order. A larger zone 170 is created when the time required to prepare a product is longer. In these embodiments, the zone size can be fine-tuned using historical production times for the items in an order.

In one embodiment, the fulfillment apparatus 160 comprises a plurality of module equipment, such as module 1 equipment 162, module 2 equipment 164, and module 3 equipment 166. When module equipment 162-166 is available, the production of an ordered product can take place in steps. Each module equipment 162-166 creates a portion of the ordered product, which is referred to herein as the module's "output" or as a "component" or "subproduct" of the ordered product. In some cases, the output of one module, such as module equipment 162, 164, is used in a later module during the production of the ordered product, such as module 3 equipment 166. Frequently, the output of an early module, such as module 1 equipment 162, is useable in a great number of possible ordered products. If an order for a particular product is received, module 1 equipment 162 can being creating its output, knowing that even if this order is cancelled this output can likely be reused as part of a different order. For example, if the order is a fast-food order for a customized hamburger and fries, the module 1 equipment 162 may be responsible for cooking the hamburger patty, knowing that this patty may be reusable in other orders.

The separation of the production process into stages handled by modular equipment 162-166 improves production time. The production is separated into components and sharable outputs of these components can be associated with freshness times or limits. On cancelation of an order, the fulfillment location processing engine 150 can mitigate lost product by re-directing reusable product outputs to other orders for re-use if the freshness time is not exceeded. Any outputs that are highly customized for a user are less likely to be re-used unless other orders specify the same customization before the freshness limit is exceeded. When reusable outputs are involved, the production sequence can be re-arranged to have sharable reusable outputs produced first and non-sharable, non-reusable outputs only in the later stages of production.

In some embodiments, entry into the first zone 172 triggers an order submission but does not trigger production of a reusable output. Rather, the receipt of the order triggers the assignment of an already made reusable component to this order. In other words, a previous order might have triggered production of the reusable component, but the previous order may have been cancelled. This pre-existing reusable component could then be assigned to the next order, obviating the need to create the component on the receipt of this next order.

In some embodiments, the system 100 might anticipate a certain percentage of canceled orders. For example, a particular fulfillment location 140 may begin processing four product orders at once. These four orders would normally cause module 1 equipment 162 to pre-make four product components in the next 3 minutes. This fulfillment location 140 might predict that, of these four orders, at least one will be canceled. With this prediction, the fulfillment location processing engine 150 may cause module 1 equipment 162 to only produce three product components. This prediction can be made by analyzing the historical heartbeat-based orders received by that fulfillment location 140 for that given time and date. This prediction can be further enhanced using an AI-assisted analysis that considers such parameters as time of day, day of week, month of year, public holidays, speed, and aggregated travelling direction for the users requesting these orders, distance from fulfillment location 140, weather, traffic conditions, and the freshness requirements for those components. In spite of this prediction, all four users may arrive for their ordered products. Because of this possibility, the fulfillment location 140 will continually monitor the user devices 110 that generated the order and their crossing of various zones 170 associated with the fulfillment location 140 in order to change its prediction as to the actual number of orders that will need to be fulfilled.

In this manner, the fulfillment location processing engine 150 uses the results of the heartbeat analysis and the crossing of zones 170 to control production equipment modules 162-166. For example, in some embodiments the fulfillment location processing engine 150 could send a "start" command instruction to a wireless gateway, which routes the start command instruction to one or more of the modular production equipment 162-166 via secured wireless connection, such as a WIFI, Bluetooth, or Zigbee connection. By separating the fulfillment apparatus 160 into modular production equipment 162-166, and controlling each with wireless communication, controlling software in the fulfillment location processing engine 150 is able to manage and manipulate the production stages of the product generation. Sharable common product components, such as that made by module 1 equipment 162, can begin their work early in the process. The sharable common product outputs can be stored in unique stage area that contains sharable order components that can be used by multiple different orders. When further information from the heartbeat analysis indicates that a user continues to approach the fulfillment location 140, the fulfillment location processing engine 150 can instruct later modules to use these shareable components and continue with next production module equipment 164 to complete the order. System 100 operates with all feature elements running or with some feature elements omitted.

Order Generation Method

Figure 2:
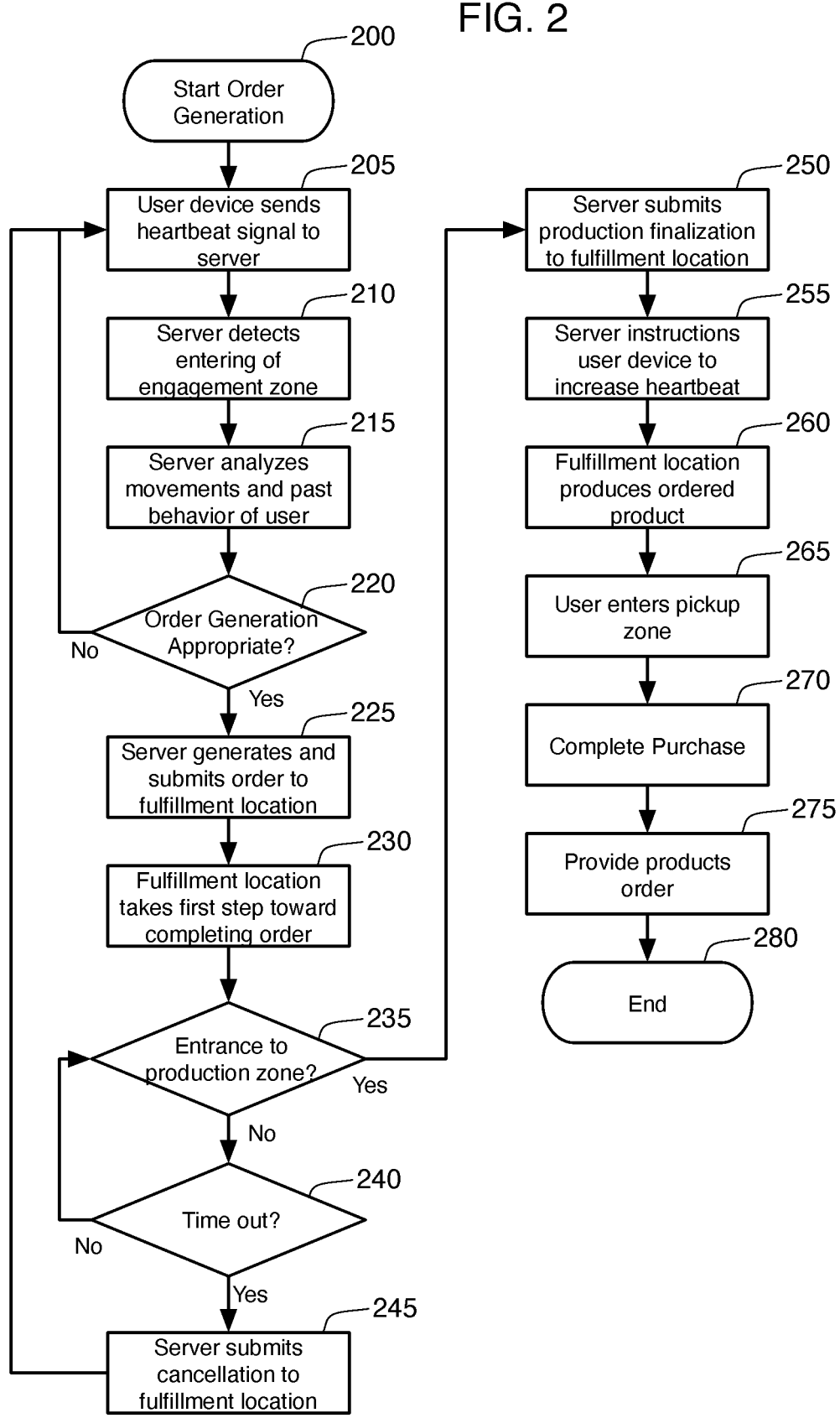
FIG. 2 is a flow chart showing a process for utilizing the first system of FIG. 1 at a single fulfillment location.

FIG. 2 shows a flow chart for a method 200 of order generation and fulfillment using system 100. In this method 200, a user order is fulfilled without the need for the user to manually place an order. Since the order in this method 200 need not be placed by the user or the user's device 110, the system 100 itself determines the content of the order. The system utilizes user preference information and past purchase behavior to determine this order content, which is described in more detail below.

The method 200 begins at step 205, where a user device 110 repeatedly sends a heartbeat signal to the server 120. This heartbeat signal contains location information concerning the user device 110, and may be sent by the user device 110 to the server 120 at regular intervals (regular intervals meaning a consistent delay between signals). As a user moves towards a fulfillment location 140 (such as a store, a restaurant, a manufacturing center, or a service provider), the server 120 will be able to determine this by analyzing the heartbeat signal. At step 210, the server 120 determines that the user device 110 is within a first zone 170 of the fulfillment location 140. This first zone may be the engagement zone 172. If the user device 110 does not enter this first zone 170, then the server 120 simply continues to monitor the heartbeat signal received at step 205 until the user device 110 does enter the zone 170.

When the server 120 determines the engagement zone 172 of the fulfillment location 140 has been entered, the server 120 must determine whether it is appropriate to send an order to that fulfillment location 140. This analysis is performed at step 215. In making this determination, the server 120 analyzes the past purchase behavior of the user of the user device 110. The server 120 may also analyze the current movement patterns of the user device 110 to determine whether these movement patterns match prior movements made of a user's device 110 prior to placing an order. At step 220, the server 120 acts upon its determination as to whether an order placement is appropriate. If not, the method 200 returns to step 205, and the server 120 continues to monitor the heartbeat signal received from the user device 110.

Although not shown in FIG. 2, the method 200 can seek confirmation of an order by the user in some embodiments. If step 215 determines that an order is appropriate, the user device 110 can be prompted before step 220 to confirm that the user would like to place an order for the determined order items. If the user selects "no," pushes a cancel button, or otherwise indicates that the order should not be placed, step 220 will cause the method 200 to return to step 205.

If step 220 determines that an order placement is appropriate, the server 120 submits an order to the fulfillment location 140 at step 225. This order placement comprises an electronic message from the server 120 to the fulfillment location processing engine 150 and includes at least a user identifier and the ordered product(s). The order placement may include timing information specifying the expected arrival time of the user device 110. Alternatively, the order placement may specify which portions of the order should be performed at the fulfillment location 140. Next, at step 230, the fulfillment location 140 begins the first steps toward completing the order. These first steps may include the fulfillment location processing engine 150 instructing module 1 equipment 162 of the fulfillment apparatus 160 to make a first, reusable component for the order. In other embodiments, the receipt of the order at step 225 does not trigger any physical production of the ordered product, but merely instructs the fulfillment location 140 to prepare for a request to produce that product.

At step 235, the server 120 continues to monitor the heartbeat signal from the user device 110 to determine if the user device is within a second zone 170 (e.g., production zone 174) of the fulfillment location 140. If not, the method 200 determines whether a time out has occurred. A timeout occurs when the user device 110 enters an engagement zone 172 but does not enter a production zone 174 for the same fulfillment location 140 before a certain, predetermined time period has passed. This predetermined time may be, for example, five minutes or ten minutes. If that timeout period has not yet passed as determined by step 240, the method 200 returns to step 235 to await the entry of the user device 110 into the production zone 174. If step 240 determines that the timeout period has passed, the server 120 submits a cancellation to the fulfillment location 140 at step 245. More particularly, a cancellation message is transmitted by the server 120 over the network 104 to the fulfillment location processing engine 150 for that fulfillment location 140. This cancellation message will cause the fulfillment location 140 to cease working on the order. If a reusable component for the order has been generated, the reusable component is freed up for another order. After the cancellation message is sent, the method 200 returns to step 205.

If step 235, the server 120 determines if the user entered the production zone 174 of the fulfillment location 140, processing continues at step 250 with the server 120 instructing the fulfillment location 140 to finalize the order. More particularly, the server 120 send an instruction over the network 104 to the fulfillment location processing engine 150 for that fulfillment location 140, and the processing engine 150 instructs the fulfillment apparatus 160 to complete the production of the ordered product.

At step 250, the server 120 instructs the user device 110 to increase its heartbeat frequency in order to increase the accuracy of the location measurement for the product pickup process. This process is described in more detail below in connection with FIGS. 9 and 10. The primary purpose of changing the heartbeat signal is to for the server to have a more accurately location of the user device 110 as it moves closer to the fulfillment location 140. In other embodiments, the zone 170 that triggers the increased heartbeat signal is the engagement zone 172 and not the production zone 174. In still further embodiments, another zone 170 is created separate from the engagement zone 172 and the production zone 174 to trigger the increased heartbeat signal. As the user device 110 approaches the fulfillment location 140, the fulfillment apparatus 160 will complete the making of the ordered product at step 260.

The user will enter a "pickup zone" for the product at step 265. This can occur before or after the ordered product is completely produced in step 260. Within this pickup zone, the user's location will be tracked carefully so that the correct ordered product can be presented automatically (or, if not completely automatically, more efficiently) as a result of the automation and the system's knowledge of the location of the user device 110. The user can then complete the purchase at step 270, a step that can also be automated by the location information gathered by the system. In one embodiment, when the received heartbeat signal indicates the user has reached the fulfillment location 140, payment for the order is automatically processed using previously stored payment information. In the alternative, payment may be processed via interaction between the user device 110 and the fulfillment location 140. The ordered products are then delivered at step 275, and the method ends at step 280. One method for monitoring the pickup zone and handling product purchase and delivery is described in more detail below in connection with FIGS. 9 and 10.

After the completion of method 200, the system 100 may instruct the user device 110 to cease its heartbeat signal once an order has been fulfilled and there are no remaining orders to be fulfilled for that device 110. In other embodiments, the increased heartbeat signal triggered at step 255 is slowed back to the normal heartbeat signal after step 275, but the heartbeat signal continues and the method 200 begins again.

In other embodiments, the system 100 does not actually generate the order from scratch, as described above in connection with steps 205-220. Rather, the user of the user device 110 submits an order identifying an ordered product and the fulfillment location 140 where they want that ordered fulfilled. The server 120 in this embodiment receives this order from the user device 110 over the network 104, and submits the order to the designated fulfillment location 140 at step 225. In this embodiment, the order received from the user device 110 may have an approximate pickup time. In which case, the first step to completing the order taken at step 230 may be based upon the designated time specified by the user device's order. In other embodiments, the order can be placed manually by the user device 110, but the system 100 still waits until the user device 110 is detected in the engagement zone 172 of the designated fulfillment location 140 (at step 210) before the server submits the order to the fulfillment location 140 (at step 225), with steps 215 and 220 being skipped.

In still further embodiments, the manual order does not identify a fulfillment location 140. In this case, the server 120 monitors the heartbeat signal (step 205), detects when the user device 110 enters the engagement zone of any fulfillment location 140 (step 210), and then submits the manual order (step 225). In some cases, potential fulfillment locations 140 are identified based on proximity to the user device 110 at the time the order is received, and only those potential fulfillment locations 140 are analyzed for entrance into the engagement zone 172.

Order Selection

Method 200 describes the automatic generation of an order at step 225. This order will include details about the ordered product that is to be created at the fulfillment location 140. The ordered product could be, for example, a beverage order, a food order (such as a breakfast burrito or hamburgers and fries), a service order, or some other type of order. In most cases, the order generates an ordered production that would have a limited lifespan and ideally can be created by modules in portions or parts. The actual content of the order can be established through user preference settings, such as by having a user pre-register preferred orders, or can be established based on a user's past transaction history.

To obtain the user's past transaction history, the server 120 would obtain access to past user orders. For example, when a user places an order via a user device 110, the server 120 can be informed of this order and then record the order information, a device identifier, a device location, and time of day information in the datastore 130.

User preference information can be limited to times of days, days of week, and physical location. For example, a user may wish to pick up a cup of beverage on a daily basis within a certain time window. The user preference settings can allow a user to define a time window for this preferred order. Similarly, the analysis of past user purchase behavior based on data stored in datastore 130 may also establish a time window for a particular order. If the user enters an engagement zone 172 for a relevant fulfillment location 140 (as determined by step 210), the server 120 will analyze the user preferences or past-purchase data as part of step 220. This analysis will identify whether the current time is within the specified time window. If so, step 220 will determine that the order is appropriate, and an order for the user's preferred beverage order will be sent to the beverage shop 140 at step 225. If the user enters that same zone outside of the preferred time window, step 220 may determine that an order is not appropriate, and the order will not be initiated. In this way, a user can pick up routine orders without needing to initiate order placement, but instead solely as a result of their travel towards a fulfillment location 140.

In one aspect, the system 100 using method 200 analyzes a user's past ordered items based upon both time and user device location. The content of the order can vary, for example, by the day of the week. In some embodiments, the time window can be defined based on daily or seasonal availability of the preferred items. For example, breakfast items may be associated with a time window corresponding to the morning hours, lunch items associated with a time window corresponding to mid-day hours, etc. The time windows associated with seasonal items may also be determined in association with geographic location of the user and changing climate conditions over the course of a year. For example, a user may establish a preference to order a particular item when seasonal temperatures reach or average a particular threshold.

Cluster Identification

Figure 3:
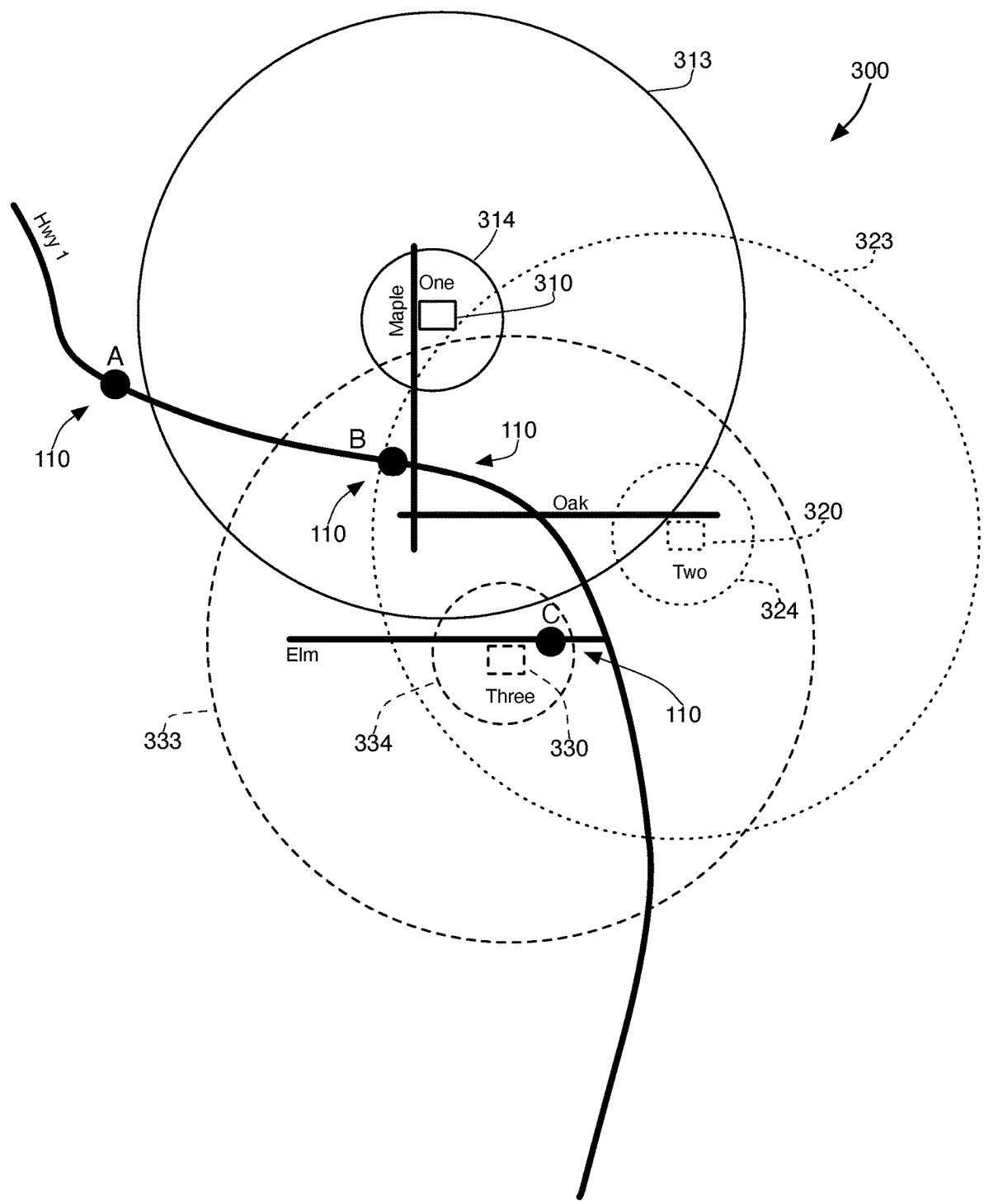
FIG. 3 is a schematic view of a second system for identifying and managing a cluster of fulfillment locations.

FIG. 3 shows a system 300 in which multiple fulfillment locations 310, 320, 330 can be engaged simultaneously to begin fulfillment of an order for a single user. Traditionally, even in systems that monitor a user's location to begin processing an order, a user can pick up their order only at the one location that received that order. If the user travels to a different location, user cannot pickup product there. System 300 eliminates the need for user to choose a fulfillment location 140 and results in time saving for users. In effect, the user is able to pick up their order at any fulfillment location 140.

FIG. 3 shows a first fulfillment location 310 having a large zone 313 surrounding it, a second fulfillment location 320 having a large zone 323 surrounding it, and a third fulfillment location 330 having a large zone 333 surrounding it. These zones 313, 323, 333 can be considered the "engagement zones," similar to zone 172 shown in FIG. 1. The three fulfillment locations 310, 320, 330 also each have a smaller production zone 314, 324, 334, respectively, that is similar to zone 174.

The user device 110 in FIG. 3 is traveling along various roads, and is shown in FIG. 3 at three different locations (locations A, B, and C) at three different times. At the first time, the user device 110 is found at location A. The user device 110 is transmitting a heartbeat signal to the server 120 at this time. The server 120 is comparing the location A identified for the user device 110 to the various zones 313, 314, 323, 324, 333, 334 that have been established for the nearby fulfillment locations 310, 320, 330. At this time A, the user device 110 is not within any zone.

At a later time, the user device 110 is located at location B, which is within the engagement zones 313, 323, 333 for all three of the fulfillment locations 310, 320, 330. Assuming that the user device 110 passed along Hwy 1 (shown on FIG. 3) from location A to location B, the user device 110 would first pass within the engagement zone 313 for fulfillment location one 310, then pass within engagement zone 333 for fulfillment location three 330, and finally pass within engagement zone 323 for fulfillment location two 320. When the user device 110 passed within each engagement zone 313, 323, 333, the server 120 assigns all three fulfillment locations 310, 320, 330 to a "cluster" of fulfillment locations that can fulfill the order for the user device 110. The fulfillment locations 310, 320, 330 in the cluster can be only a subset of all fulfillment locations 140 in a system 100. The server 120 may transmit a request to begin the order at each of the fulfillment locations 310, 320, 330 in the cluster. When these orders are received, the fulfillment location processing engine 150 at each fulfillment location 310, 320, 330 will begin creating the ordered product by triggering the production of reusable components by the first module equipment 162. In the context of a custom hamburger and fries order, for example, the first module equipment 162 at each fulfillment location 310, 320, 330 would begin cooking a hamburger patty for the user device 110 when their engagement zone 313, 323, 333 was crossed.

In one embodiment, the production performed by the second and third module equipment 164, 166 at each fulfillment location 310, 320, 330 is not initiated until the user device 110 has passed into the production zone 314, 324, 334 for that fulfillment location. At a later time, however, the user device 110 is now at location C (most likely because the user device turned off of Hwy 1 onto Elm). At location C, the user device 110 is now within the production zone 334 for the fulfillment location three 330. When the server 120 recognizes this, it will communicate with the fulfillment location processing engine 150 at fulfillment location three 330 in order to trigger the completion of the order through the work of module 2 equipment 164 and module 3 equipment 166 at that fulfillment location 330. Because the production zone 334 for fulfillment location three 330 has been entered, the system 300 now knows that the user of user device 110 is (likely) not proceeding to fulfillment location one 310 or two 320. The server 120 will therefore send signals to these fulfillment locations 310, 320 that cancels the order for this user device 110. The reusable components products at these locations 310, 320 will then be made available for other orders.

In this system 300, the selection of the fulfillment locations 310, 320, 330 for a cluster is based on the engagement zone 313, 323, 333 for those locations. The zones 313, 323, 333 can be dynamic zones that reflect the travelling speed and direction of the user device 110, the past travelling behavior of the user associated with the user device 110, and the past order history for that user. This past history analysis can be dependent upon the time of day, day of week, and public holidays when comparing a present situation to past behaviors. The size of the zones 313, 314, 323, 324, 333, 334 can vary depending upon order to be fulfilled, with more complicated orders requiring more time to produce and thus require a larger zone 170 if the order is to be produced when the user device 110 arrives at the fulfillment location 310, 320, 330. In some embodiments, the sizes of zones 313, 314, 323, 324, 333, 334 are calibrated and improved using offline analysis of the historical data.

The fulfillment locations 140 that are included in the cluster will change over time with the movement of the user device 110. For example, as the server 120 determines changes in the location of the user device 110, the cluster of potential fulfillment locations may be updated to include one or more new fulfillment locations 140. When a new fulfillment location 140 is added, the order information is transmitted by the server 120 to the fulfillment location processing engine 150 for that fulfillment location 140. If a fulfillment location 140 is removed (by, for example, the user device 110 exiting the engagement zone for that fulfillment location 140), the order information already provided to that location will be canceled.

The server 120 uses an aggregated travelling direction to determine if user device 110 is travelling towards or away from any fulfillment location 140. Traveling direction for the user device 110 can also be used in the selection of fulfillment locations 310, 320, 330, ensuring (for instance) that locations already passed by the moving user device 110 will not be included in the cluster. The aggregated travelling direction is determined by examining the location of the user device 110 over a time interval that is long enough to indicated overall travelling direction.

Figure 4:
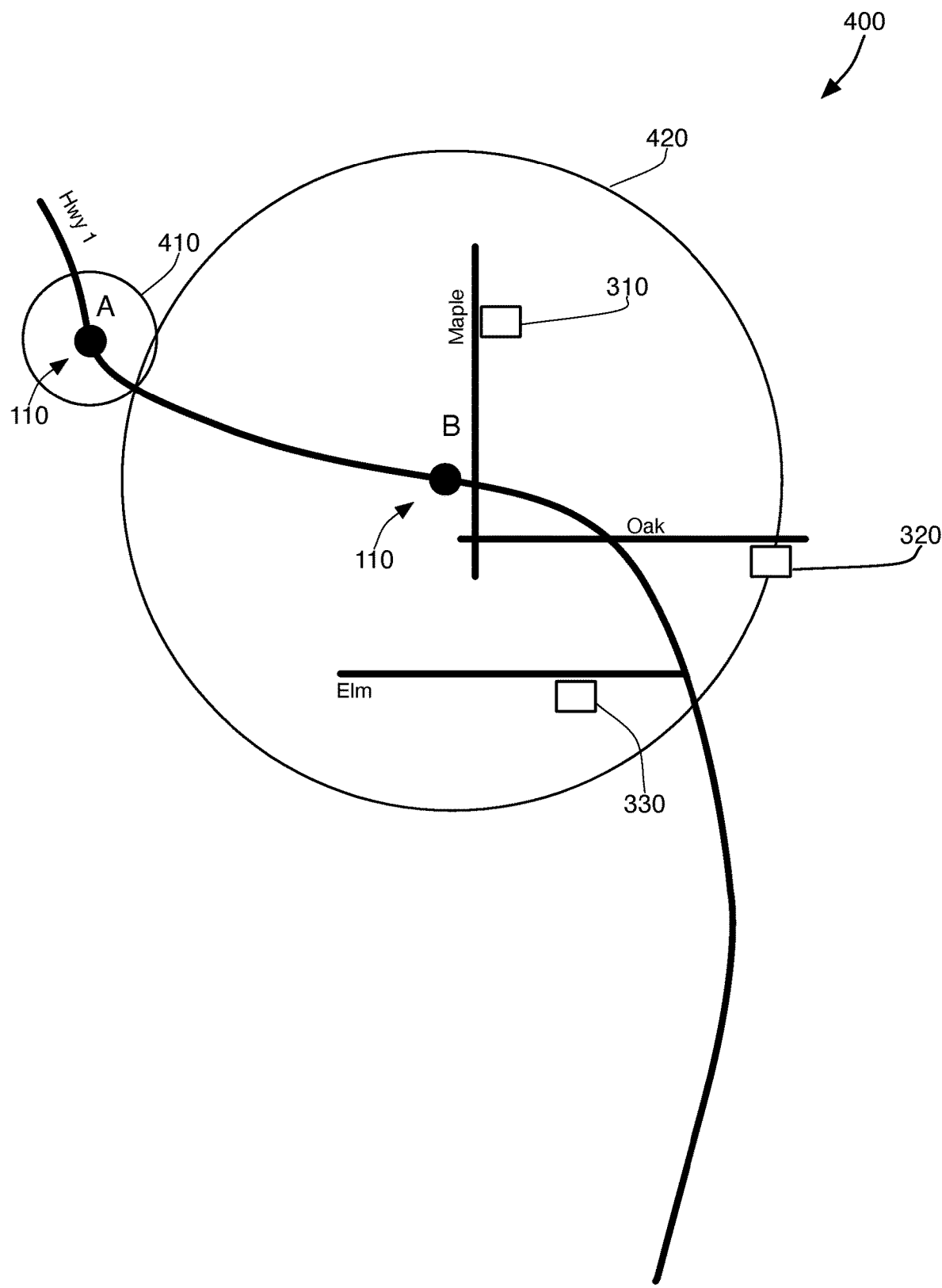
FIG. 4 is a schematic view of a third system for identifying and managing a cluster of fulfillment locations.

FIG. 4 shows an alternative system 400 for creating a cluster of fulfillment locations. This system 400 is shown using the same geographic layout of FIG. 3, with three fulfillment locations 310, 320, 330 found in the same geographic location. In this embodiment, a cluster radius is defined by the server 120 around the geographic location of the user device 110. In some cases, the size of the cluster radius is based upon the movement (such as the speed) of the user device 110. As shown in FIG. 4, the cluster radius 410 at point A is smaller than the cluster radius 420 that is defined when the user device 110 is at point B. This might indicate that the user device 110 is moving at a significantly faster speed at point B than at point A. In this embodiment, the cluster of fulfillment locations is determined by identifying which fulfillment locations 310, 320, 330 are within the zone created by the cluster radius 410, 420 of the user device 110. Thus, when the user device 110 is at point A, the cluster of fulfillment locations is empty. When the user device 110 is at point B, the cluster of fulfillment locations includes all three fulfillment locations 310, 320, 330. When a fulfillment location in the cluster radius falls outside the cluster radius, this fulfillment location is removed from the cluster.

Note that this description of FIG. 4 describes the zone around the user device as a cluster "radius," and this is shown as circular in FIG. 4. However, there is no reason for this zone to be limited to a circular shape. In fact, the preferred embodiment will distort the shape based on the speed and direction of the user device 110. Locations along Hwy 1 in FIG. 4 in the direction of travel for the user device 110 can be arrived at more quickly than locations significantly off of Hwy 1 (because of local traffic and lower speeds) or locations that are "behind" the user device 110 (as determined by the direction of travel). Thus, many embodiments of this system 400 will utilized a non-circular cluster "radius" that is biased toward the direction of travel. Nonetheless, the term "cluster radius" will continue to be used in this description for this zone and should be interpreted to include non-uniform, non-circular zone patterns.

Cluster Processing Method

Figure 5:
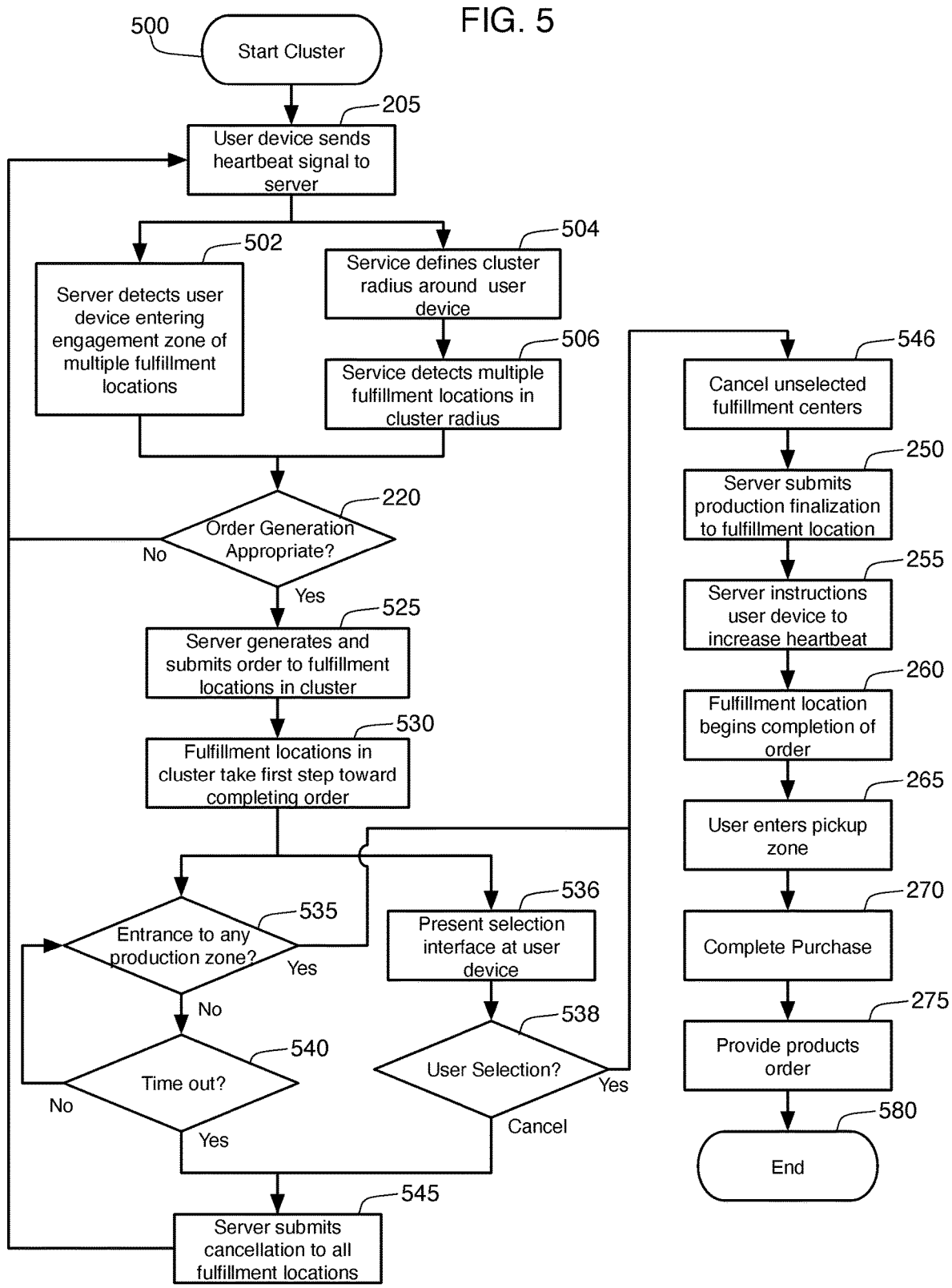
FIG. 5 is a flow chart showing a process for identifying and managing the cluster of fulfillment locations using the systems of FIGS. 3 and 4.

FIG. 5 presents a flow chart for a method 500 of using systems 300, 400 for defining a cluster of fulfillment locations. This method 500 is very similar to method 200 described above. In fact, many of the steps in method 200 are repeated in method 500, and therefore use the same figure numbers. Similar steps use similar figure numbers. In fact, method 500 begins in the same way as method 200, namely with the user device 110 sending a heartbeat signal to the server 120 at step 205.

The next step can vary depending upon whether system 300 or system 400 is being used. If system 300 is used, the server 120 is responsible at step 502 for monitoring the heartbeat of the user device 110 to determine when the user device 110 has entered into the engagement zones 313, 323, 333 of one or more of the multiple, possible fulfillment locations 310, 320, 330. When the user device enters one of these zones 313, 323, 333, the applicable fulfillment location is added the cluster of fulfillment locations for that user device 110. At location B, all three fulfillment locations 310, 320, 330 will be included in the cluster.

If system 400 is used, the server 120 is responsible at step 504 for defining a cluster radius around the user device 110. This cluster radius can vary in size, for instance with a small cluster radius 410 being defined around the user device 110 if the device is moving slowing, and a large cluster radius 420 being defined if the user device 110 is moving quickly. As explained above, the cluster radius need not have a circular shape. At step 506, the server 120 then determines which of the possible fulfillment locations 310, 320, 330 are within the current cluster radius 410, 420. If there are any, they will be included in the cluster of fulfillment locations. At location B, all three fulfillment locations 310, 320, 330 will be included in the cluster.

Regardless of whether system 300 or system 400 is used, the method 500 will continue to monitor the heartbeat signal received at step 205 until steps 502 or 506 identify fulfillment locations 140 for the cluster. If only a single fulfillment location 140 is detected, method 200 can be used as method 500 is designed to identify and handle multiple fulfillment locations in a cluster. In some embodiments, a first fulfillment location 140 is first identified, and steps 502-506 are utilized to add second/additional fulfillment location 140 in order to create the cluster.

When the cluster of fulfillment locations 140 is identified, step 220 determines whether it is appropriate to submit an order for a product production to these fulfillment locations. This step is described above in connection with FIG. 2 and relies upon an analysis of user preferences and historical data stored in the datastore 130. If step 220 determines that the order should be placed, the order is placed with multiple fulfillment locations 140 in the cluster, such as fulfillment locations 310, 320, 330. This occurs at step 525. As a result of receiving this order, each fulfillment location 310, 320, 330 will then take the first step in fulfilling that order at step 530.

At step 535, the server 120 will determine whether the user device has entered any production zone for any fulfillment location 140 in the cluster, such as production zones 314, 324, 334 for fulfillment locations 310, 320, 330, respectively. This is similar to step 235, except that step 535 examines the production zones 314, 324, 334 for all fulfillment locations 310, 320, 330 in the cluster. If not, step 540 will determine whether or not a time-out occurred. If not, step 535 is repeated. If step 540 determines that a timeout has occurred, step 545 will cancel the order at all fulfillment locations 310, 320, 330 that received the order at step 525. After this, the method 500 will return to the server 120 monitoring the heartbeat signal at step 205.

Alternatively, the time out identified in step 540 is determined separately for each of the fulfillment locations 310, 320, 330 based upon when the user device 110 entered the respective engagement zones 313, 323, 333. In this alternatively, only the order at the timed-out fulfillment location 310, 320, or 330 will be canceled. If multiple fulfillment locations 310, 320, 330 have not been timed-out, processing continues at step 535.

If step 535 determines that the user device 110 has entered into one of the production zones 314, 324, 334 associated with the cluster of fulfillment locations, then processing of that order at the selected fulfillment location 140 (the fulfillment location 140 where the production zone 174 was entered) will begin at step 546.

The time out step 540 is shown in FIG. 5 as applying a single time out value to all fulfillment locations 140 in the cluster. In many embodiments, separate fulfillment locations 140 will have separate time out values based upon when the order was submitted to the fulfillment location 140 at step 525. These separate time out values would allow the different fulfillment locations 140 to time out at different times at step 540.

Figure 6:
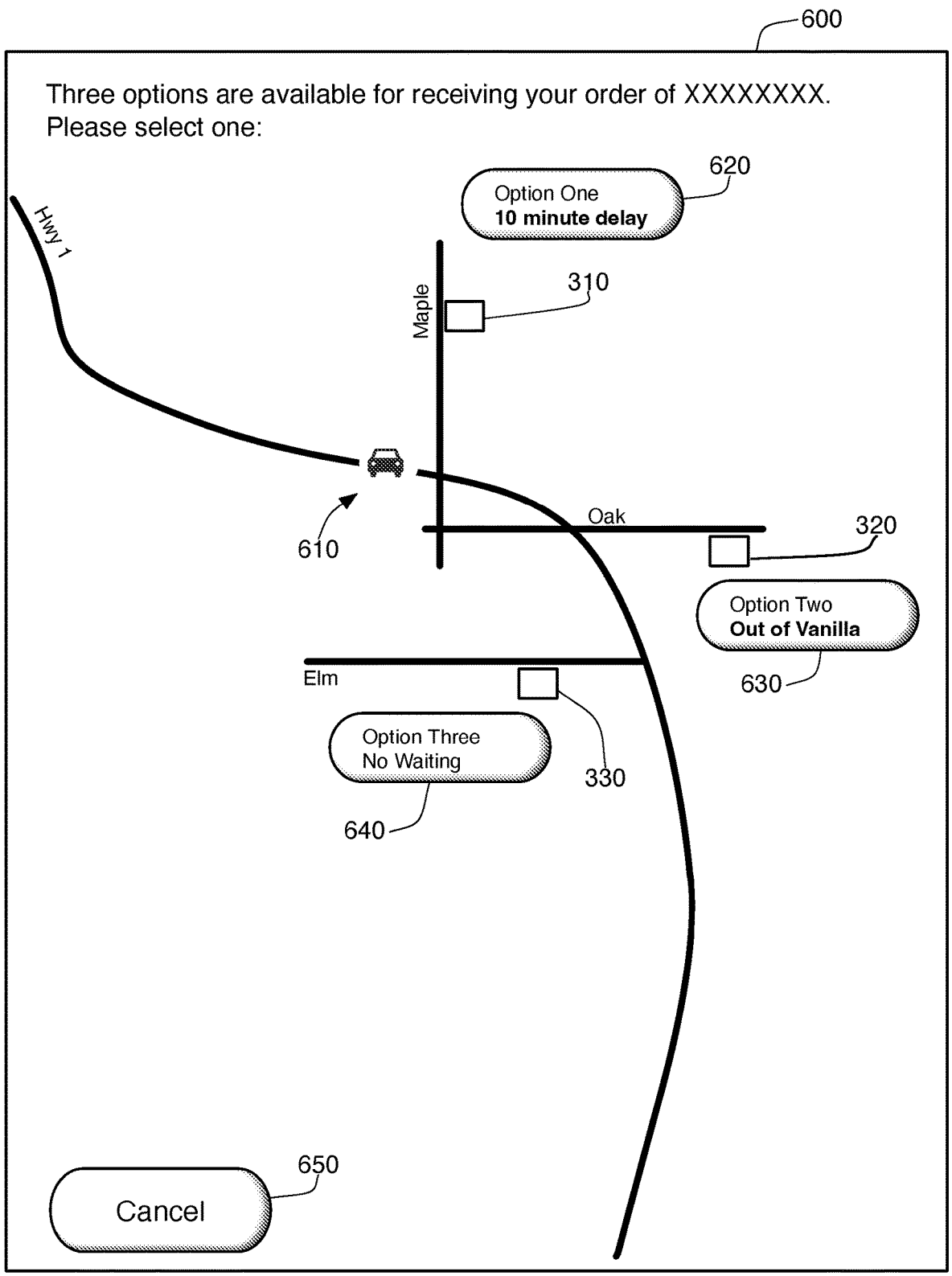
FIG. 6 is a schematic view of a user interface generated by the process of FIG. 5.

Method 500 includes an alternative technique for identifying the selected fulfillment location 140 in a cluster, namely through the presentation of a selection user interface 600 (as shown in FIG. 6) at step 536. This interface 600 is presented on the user interface of the user device 110, such as on a mobile device 112 or on an automotive device 114 that uses a display device permanently mounted in the vehicle. The interface 600 provides notification to the user device 110 that the fulfillment locations 310, 320, 330 have been assigned to the cluster of fulfillment locations 140 and are available for the user to pick up their order. The location of these three fulfillment locations 140 can be presented on a map-like interface 600 that also shows the current location 610 of the user device 110.

One purpose of this interface 600 is to let the user manually select a fulfillment location 310, 320, 330 to complete an order. To allow this, a selection button 620, 630, 640 is presented proximal to each fulfillment location 310, 320, 330, respectively. The user can select one of these interface buttons 620, 630, 640 to select fulfillment location 310, 320, 330, respectively. This selection is received at step 538 of method 500. The manual selection of a fulfillment location 140 in this manner serves the same purpose as the selection of a single fulfillment location 140 at step 535, namely the triggering of the full production of the order at that fulfillment location 140 at step 546.

Because the order may have been generated automatically at step 525 through the analysis of step 220, it is possible the user will not actually want the order fulfilled. Interface 600 therefore gives the user the option to cancel such an order. In the example of FIG. 6, the option to cancel is presented through interface button 650. If a cancelation selection is made, step 538 determines this, and the method 500 moves to step 545.

Another purpose for presenting interface 600 is to provide additional information to the user about the fulfillment locations 140 in the cluster. In FIG. 6, this information is incorporated into the selection buttons 620, 630, 640. Selection button 620 indicates that there is a ten-minute delay at fulfillment location 310, perhaps caused by high traffic volume. Selection button 630 indicates that the second fulfillment location 320 is out of vanilla, which may make it impossible for fulfillment location 320 to provide the exact ordered product desired by the user. The information provided by selection button 640 merely indicates that there is no waiting if fulfillment location 330 is selected.

In some cases, server 120 will recognize that shortages such as that described in button 630 may prevent the creation of the ordered product altogether. In these cases, the server 120 will prevent fulfillment location 320 from being added to the cluster at step 220, and the interface 600 would merely present information about why that fulfillment location 320 is not part of the cluster without presenting a selection button 630.

To provide this information about the various fulfillment locations 140, the fulfillment location processing engines 150 must periodically update the server 120 with status information about that fulfillment location 140. Consequently, if it is determined that a fulfillment location 140 cannot efficiently fulfill all of a user's order (e.g., fulfillment location 140 is unusually busy, or equipment is out of service, or an item is not in stock, or the fulfillment location 140 is closed), the fulfillment location processing engine 150 notifies the server 120, which in turn can send include this status information in interface 600. Using the fulfillment location status, a user can skip a busy fulfillment location 140 and head to the next fulfillment location 140 on the user's travelling path.

Of course, other interfaces are possible other than interface 600 shown in FIG. 6. The user interface might, for example, provide a green dot on map for an available fulfillment location 140 and a red dot of map for an unavailable fulfillment location 140. The user device 110 might also deliver fulfillment location status through an audible interface.

Returning to FIG. 5, step 536 presents a selection interface (such as interface 600) to the user device 110 for display to the user. At step 538, the interface 600 receives the selection. As explained above, if the user cancels by selecting cancel button 650, the method 500 continues with the cancelation at step 545, which will cancel the order at all fulfillment locations 140 in the cluster.

If the user provides a selection of a particular fulfillment location 140, then the method continues at step 546. This step 546 is also executed if step 535 indicates that a user device 110 has entered a production zone 174. At this point, the server 120 will communicate with the fulfillment location processing engines 150 at each of the unselected fulfillment locations 140 to tell them that the order at that location has been canceled. Any subproducts that are created from any preliminary process steps, such as the output from the first module 1 equipment, will then be made available for reuse for other orders.

At this point, the remainder of method 500 comprises steps 250-275 of method 200 as applied to the selected fulfillment location 140. In these steps, the order is produced, the user enters a pickup zone, completes the purchase, and is provided the completed product. After this, the method 500 ends at step 580.

Modular Pre-Make Process

The ability to reuse subproducts (components) from preliminary process steps can shorten the time to make an order after final production instructions are received. In particular, if certain subproducts can be reused in the manufacture of orders, a pre-make process will manufacture these subproducts in accordance with a prediction based on historical data. The pre-made, reusable components can be stored in unique stage area at the fulfillment apparatus 160, and then pulled from that staging area for the next production module equipment 162, 164 to complete an order. This pre-make process can lower wait time and allows higher volumes to flow through the fulfillment location 140.

One process to maximize the advantage of pre-making components is to capture a current snapshot of user devices 110 that are relevant to a particular fulfillment location 140. A time period, such as a two-minute time period, can be defined to select a current snapshot. When this time period is over, a new snapshot can be created. The snapshot time interval should be long enough to ensure all user devices 110 within an engagement zone 172 have sent in at least one heartbeat signal to the server 130. The interval should be short enough to ensure accurate predication on pre-make quantity for an upcoming time interval. The interval chosen for a snapshot might be, for example, between 9:00 am and 9:02 am (a two-minute time period).

During a snapshot, the heartbeat signals identify all user devices 110 within the engagement zone 172 of the fulfillment location 140. Interpolation of the heartbeat signals can be used to identify the current location of all such user device 110 at a particular time (such as the time in the middle of the time period, or 9:01 am). In some embodiments, the count will not include user devices 110 that are determined to be moving away from the fulfillment location 140.

The count for the current snapshot is then compared to historical data. This historical data identifies the number of user devices within the engagement zone 172 of a fulfillment location 140 at a particular time, and the resulting purchase transactions during a future related time period. For instance, if in a previous time period, the presence of six user devices 110 within an engagement zone 172 has led to immediate-future sales of three products, this data will be stored in the datastore 130 as historical data. In other words, this historical data will include information about user device counts within engagement zones 172 for fulfillment locations 140 and immediate future sales of products at those fulfillment locations 140. Sales information will include type and quantities of products purchased during these sales transactions. This historical data is also associated with various aspects about the sale, including the time of the sale, the current weather at the time of the sale, calendar information for the sale (such as whether this was a Monday or a major holiday), and even information related to construction and detours around the fulfillment locations 140. To the extent possible, linkages will also be made between the information about the user devices 110 within the engagement zone 172 (location, direction of travel, distance from fulfillment location 140, and speed of the user device 110) and the resulting sales. If a sale cannot be directly linked to a particular user device, statistical analysis will be used to determine a statistical relationship between the presence of the user device 110 within the engagement zone 172 and a future sale. All of this data will be stored together with associated condition information (weather, traffic, detours, time of day, day of week, etc.).

The comparison between the current snapshot count and the historical data in the datastore 130 is based upon known information for the current snapshot. For example, the system 100 may identify the current day as a Tuesday, Aug. 1, 2023. It is 9:01 am (the middle of the current snapshot), a workday, the first week of August, a non-federal holiday in the United States, traffic is light, there are no detours, it is sunny, and it is already 81 degrees Fahrenheit. All of these characteristics will be used to compare the current snapshot period to historical data maintained by the system.

The comparison with the historical data is then used to predict quantity of the future sales, which relates directly to the need to manufacture pre-made subproducts. The comparison can be based upon machine learning (artificial intelligence) algorithms that use the presence, location, direction of travel, and speed of user devices 110 within the engagement zone 172 to predict product sales in an immediate-future time. These predictions will also be based upon other known factors about the present and historical data (day of the week, weather, etc.). The "immediate-future" duration will depend, of course, on the size of the engagement zone 172. If the engagement zone 172 is designed to approximate ten minutes of travel time to arrive at the fulfillment location 140, the immediate-future duration will likely be approximately ten minutes (plus any additional time for expected delays in a purchase queue). Because the snapshot intervals are so small, and the immediate-future time is not significantly longer, numerous historical training data points can easily be generated along with numerous test data elements.

Note, in other embodiments the immediate-future duration is as long as the snapshot duration. For example, if the snapshot duration is two minutes (from 9:00 am to 9:02 am), the immediate-future duration would also be two minutes (from 9:02 am to 9:04 am).

The prediction algorithm obtained through the machine-language training will then generate a prediction of approximate sales in the immediate future based upon the current snapshot of user devices 110. This prediction can then be used to start pre-make production of reusable subproducts.

A non-machine learning algorithm is also possible, using a basic algorithm that starts with the current snapshot of user devices. Information about this snapshot (including time of day, the particular fulfillment location 140, the current weather, day of the week and year, holidays, and traffic, for example) are used to identify historically similar snapshot data from the datastore 130. It is possible that multiple snapshots in the datastore 130 will be determined to be similar to the current snapshot. The historical snapshot data is then analyzed to develop a correlation between the number, location, and direction of travel of user devices 110 in the engagement zone 172 and sales in the immediate-future duration. This correlation can then be applied to the number, location, direction, and speed of travel of the user devices 110 in the engagement zone 172 in the current snapshot in order to develop a prediction of future sales. This prediction is then used to start pre-make production of reusable subproducts.

Note that the algorithm to develop the correlation in the non-machine-learning environment can be improved over time through statistical analysis, much in the same manner as additional data points can be used to improve the training of the machine-learning system. In other embodiments, the correlations can be pre-analyzed and stored in the system 100 (such as at the datastore 130), so that the analysis of the current snapshot need only compare parameters to the pre-determined correlations (as opposed to identifying specific historical datapoints for each snapshot). Furthermore, the correlations developed for one snapshot (from 9:00 am to 9:02 am) will likely be the same correlations developed for other snapshots in the same general time period (such as the snapshot from 9:14 am to 9:16 am), although the snapshot data (number of user devices 110, distance of the user device 110 from the fulfillment location 140, direction and rate of travel, etc. during the snapshot time period) will clearly vary from snapshot to snapshot.

As explained above, these predictions are used to pre-make reusable components, such as through the operation of first module equipment 162. The reusable components can then be stored until needed for final production, such as by the second and third module equipment 164, 166.

Heartbeat Mechanics

Figure 7:
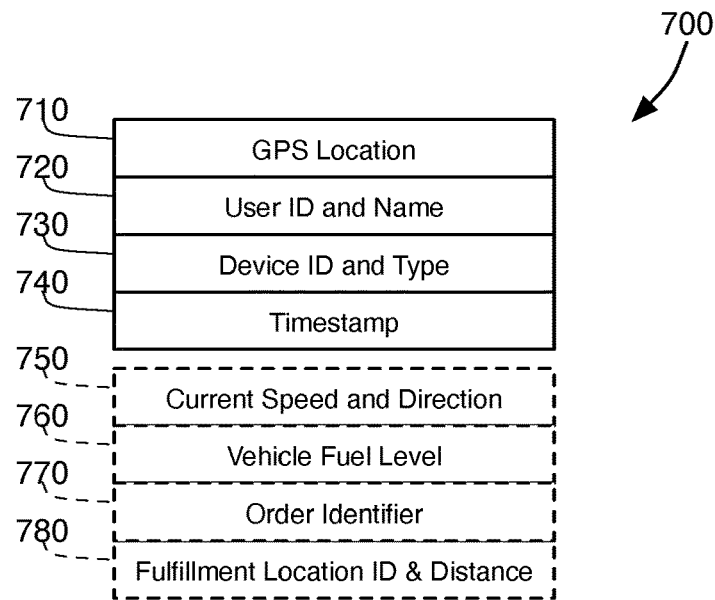
FIG. 7 is a schematic view of a heartbeat token.

As explained above, a heartbeat signal that provides location information about the user device 110 is submitted to the server 120. The signal itself can take the form of a plurality of data tokens, such as the particular heartbeat token 700 shown in FIG. 7. This token 700 will include location information 710 and a user identifier 720. The location information 710 can be acquired from the GPS satellites 102 or through other location identification means known in the art. The user identifiers 720 comprises a unique identifier for a user. In some cases, the user identifier 720 also includes other information such as a user's name. In other cases, the datastore 130 will associate the user identifiers 720 with a username, meaning that there would be no need to transmit the user's name as part of the heartbeat token 700.

In some cases, a single user will be associated with a plurality of user devices 110, such as a smartphone computing device 112 and a user automotive device 114. In these cases, it can be useful to include a device identifier 730 in the heartbeat token 700 in order to identify the device 110 that transmitted this token 700. This device identifier 730 will be a unique identifier for a particular user device 110. It can be unique only for that user (such as "device 1" for a particular user id), or it can be unique across the entire system 100. The use of universally unique device identifiers 730 can obviate the need for a separate user identifier 720 to be included in the heartbeat token 700. The device identifier 730 in these cases can function as the user identifier 720, as device identifiers 730 can be associated with a user in the datastore 130. The device identifier 730 in the heartbeat token 700 can also include type information, although the datastore 130 can also store device type information in association with the device identifier 730. The heartbeat token 700 will also include a timestamp 740 indicating the approximate time at which the heartbeat token 700 was transmitted from the user device 110.

Heartbeat elements 750-780 are shown in dashed boxes, as these elements are considered optional elements of the heartbeat token 700 depending on the embodiment. Element 750 is the current speed and aggregated travelling direction of the user device 110. Some devices 110, include automotive devices 114, will have speed and travelling direction readily available for inclusion into the heartbeat signal, while other devices 110 can easily derive this information from GPS location data. This speed and direction of travel information 750 is considered optional because it can also be derived at the server 120 through the location information 710 in the heartbeat token 700. However, in some instances the heartbeat tokens 700 that comprise the heartbeat signal are sent periodically, with a period great enough that the current speed and travel direction of the user device 110 is not accurately determinable from the location information 710 alone. Thus, this information 750 is typically included in the heartbeat token 700.

The heartbeat token 700 can also include information about the fuel level of the vehicle 760 (assuming the user device 110 is an automotive device 114). This information can be useful in anticipating necessary refueling stops. In other cases, a user may have manually selected/input a product or service order and a fulfillment location 140 for that order into their device 110. In this case, the order information 770 and the selected fulfillment location identifier and current distance 780 can also be included in the heartbeat token.

The user device 110 creates the heartbeat token 700 and embeds the appropriate values 710-780 within the token. The heartbeat token 700 is regularly send by the user device 110 to the server 120 as the geohearbeat signal. These tokens can be sent at regularly repeating intervals, although the intervals need not be regular or consistent. For example, if the user device 110 is stationary, the heartbeat signal might be sent every one hundred seconds. In one embodiment, when the server 120 determines that the location of a user device 110 is changing, the transmission frequency of the heartbeat token 700 increases so that more frequent location information is gathered to allow the server 120 to determine if the user device 110 is moving toward a fulfillment location 140. Such a moving user device 110 might transmit the heartbeat signal every ten seconds. In another embodiment, when the user device 110 enters a first zone 172 for a fulfillment location 140, or has otherwise approached within a preset distance of the fulfillment location 140, the server 120 instructs the user device 110 to increase the frequency of the transmission of the heartbeat tokens 700, such as to one heartbeat token 700 every two seconds. This is described above in connection with step 255. In still other embodiments, the transmission frequency of the heartbeat tokens 700 is increased again when user is near a pickup zone (step 265 above), such as to one heartbeat token every one second. When the user moves away from the various zones 170, such as by moving away from a location by a present distance, the heartbeat token frequency might slow in a corresponding manner. Note that the pre-defined distances (zone size) and heartbeat token 700 frequency can be fine-tuned as needed. In one embodiment, such fine-tuning is performed by an offline AI analysis engine based on historical transaction data and historical heartbeat signals that are collected in the vicinity of a fulfillment location 140.

Heartbeat Transfer

Figure 8:
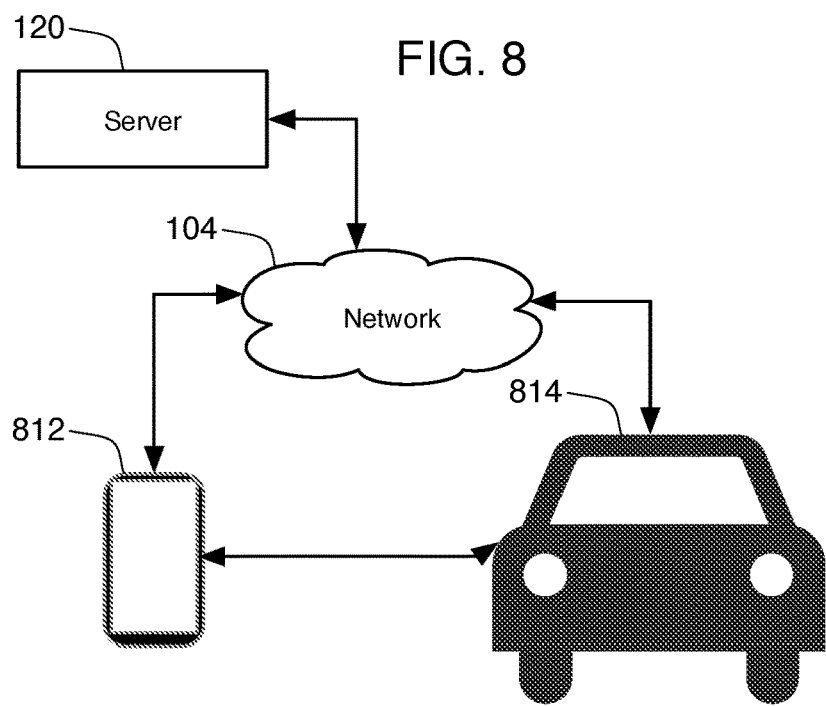
FIG. 8 is a schematic view showing transfer of a heartbeat signal between a smartphone device and an automotive device.

As noted above, a single user may be associated with multiple devices 110. In FIG. 8, a single user has both a smartphone device 812 and an automotive device 814. The automotive device 814 has a computerized system with a user interface that can operate apps designed for that device 814. Each of these devices 812, 814 operate an app, which is a specially designed program that is able to send heartbeat tokens 700 periodically to the server 120 over the network 104. In one embodiment, the user can be outside the automobile device 814. At this point, the smartphone device 812 generates the heartbeat signal for the user, which is then used according to method 200 and method 500. At a later time, the user may enter the automotive device 814 and turn it on. At this point, the smartphone device 812 may connect to the automotive device 814, such as by recognizing the on-state of the automotive device 814 and establishing a wireless connection thereto. This wireless connection may take many forms, but in one embodiment it is a Bluetooth connection. In making this connection, the app on the smartphone device 812 will communicate with the corresponding app on the automotive device 814, indicating that the automotive device 814 should take over as the primary device (or dominant device) for the user in the system 100 by taking over responsibility for sending the heartbeat tokens 700 for the heartbeat signal. The server 120 would recognize that the heartbeat tokens 700 that it then receives from the automotive device 814 is from a different device (as identified by element 730) but for the same user (through element 720). While the user is driving in the vehicle, the automotive device 814 will generate the heartbeat signal, and display any interfaces (such as interface 600) for the app as needed by methods 200, 500.

At some point, the user may stop the vehicle and continue toward a fulfillment location 140 on foot. When the smartphone device 812 recognizes that the connection to the automobile device 814 has been disconnected, the smartphone device 812 will take over as the primary device in the system 100 and resume sending the heartbeat tokens 700 for the user. The smartphone device 812 will also take over presenting any user interfaces to the user.

There are several technical advantages for transferring responsibility for the heartbeat signal in this manner. First, mobile devices such as the smartphone device 812 tend to run out of power. This transferring of responsibility will reduce the battery draw on the smartphone device 812 caused by providing the heartbeat signal. In addition, the use of the smartphone device 812 while driving an automobile may cause the user to take their eyes off the road. The transfer of control to the user interface of the automotive device 814 therefore improves driving safety by utilizing interfaces designed for the built-in touch displays and voice interface of the automotive device 814.

To make the transfer of control between the devices 812, 814, the system 100 uses wireless communications and the exchange of security handshake and authentication protocols, such as via Bluetooth, WIFI, or 5G C-V2X sidelink. During this direct communication, the app on the smartphone device 812 sends transfer control message to the app on the automobile device 814. The automotive device 814 verifies that the smartphone device 812 exists on automotive devices' known device list. If smartphone device 812 is not on the known device list, the automotive app will reject the transfer of control. If smartphone device 812 is on known device list, smartphone device 812 sends information about any pending orders to automotive device 814 and then relinquishes control of order processing and the heartbeat signal to the automotive app. The devices 812, 814 can continue to send connection verification signals to each other via device-to-device communications.

In other embodiments, the smartphone device 812 and the automobile device 814 do not communicate directly with each other, but instead accomplish the same result via communications with the server 120. Both devices 812, 814 periodically send heartbeat signals to the server 120. Location tracking at the server 120 compares the location of smartphone device 812 and the automobile device 814. The server compares the travelling path (location, speed, and direction) of user's phone and vehicle's travelling path to determine whether the smartphone device 812 and the automobile device 814 are travelling in unison, i.e., a user is driving with the smartphone device 812 in the vehicle 814. If so, the server 120 confirms that the smartphone device 812 exists on automotive app's known device list. Once this is confirmed, the server 120 sends a pause request to the app on the smartphone device 812, and sends a request to the automobile device 814 to take control. The smartphone device 812 continues to send its own heartbeat signal to the server 120, but perhaps this is sent less frequently than the heartbeat tokens 700 sent by the automobile device 814 when it is in control. This allows the server 120 to determine when the user carrying the smartphone device 812 has stepped away from the vehicle 814. When this is determined, the server 120 sends an instruction to smartphone device 812 to resume control and sends instruction to automobile device 814 to stop its processing. In some embodiments, the server 120 may be configured to transfer control to the automobile device 814 only after a threshold speed is attained.

More than one user can register their user portable devices 112 with the app operating on the same automotive device

114. Regardless of whether direct communication between the devices 112, 114 takes place, or communication takes place only with the server 120, the automotive device 114 will exchange control of the heartbeat signal only with pre-registered smartphone devices 112. Depending on the capacity and configuration of user's mobile device and automotive device, the system 100 will operate for a user in any of these settings: mobile-device-only setting, mobile-and-automotive-setting or automotive-only-setting. One example of capacity and configuration is when the appropriate app not installed on automotive device. In this case, system 100 will operate in mobile-only setting for this user.

Order Pickup

Figure 9:
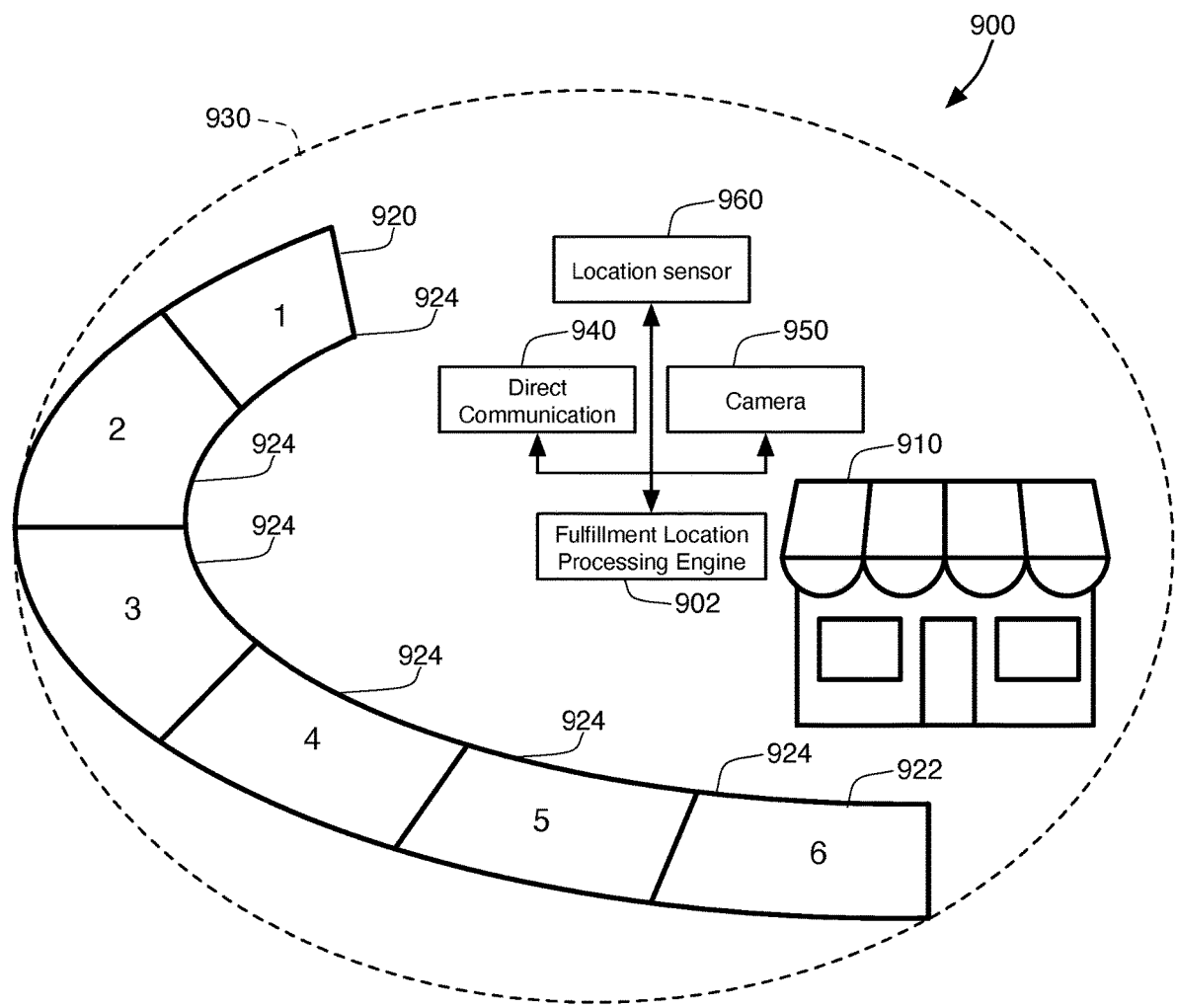
FIG. 9 is a schematic view of a fulfillment location utilizing geocells.

FIG. 9 shows a fulfillment location 900 which includes a physical storefront 910. The storefront 910 can be an occupied building with employees that assist in the production and delivered of an ordered product by interacting with the fulfillment apparatus 160. The storefront 910 can also be an automated kiosk in which the fulfillment apparatus 160 is fully automated. In either case, the user can approach the storefront 910 (step 265 of method 200), be detected, make payment for their product (step 270), and have their ordered product provided to them (step 275). At this particular fulfillment location 900, a pickup path 920 is defined. A pickup path 920 is a predefined, anticipated path of travel ending at or near a pickup location 922 adjacent the storefront 910. The pickup path 920 can be associated with an additional zone 170, namely a pickup zone 930.

When a user device 110 enters the pickup path 920, they enter this pickup zone 930. In some embodiments, the pickup zone 930 takes the place of the production zone 174, in which case entry into this pickup zone 930 triggers the finalization of the ordered product via steps 235-260 of method 200. In such embodiments, entry into a pickup zone 930 can also function as the entry into one of the production zones 314, 324, 334 that is detected by step 535 as described above, which would then cause a cancellation of the orders at other fulfillment locations 310, 320, 330 in the cluster. In some embodiments, the pickup zone 930 contains multiple pickup paths 920. Entering pickup zone 930 selects the fulfillment location 900. The pickup zone 930 delegates the task of starting production to the pickup path 920. Entering one of the pickup paths 920 will start production at that pickup path 920. In some embodiments, entering pickup path 920 selects the fulfillment location 900 and starts production.

In other embodiments, entry into the production zone 174 is different than entry into the pickup zone 930, in that entry into the production zone 174 begins the finalization of the ordered product at steps 235-260 of method 200, while entry into the production pickup zone 930 triggers more careful monitoring of the progress of the user device 110 so at to perfectly time final production of the ordered product with the arrival of the user device 110 at the pickup location 922.

When the user device 110 is at the pickup location 922, the fulfillment location 900 completes the purchase (step 270) in a payment transaction. This payment process can utilize payment data stored in the datastore 130 and, if necessary, data analysis provided by the server 120. The processing of the payment can be based on location data for the user device 110. For example, the fulfillment location processing engine 902 (or some other computerized system at the fulfillment location 900) may automatically process payment without additional user action when it is determined that the user device 110 has arrived at the pickup location 922. In one embodiment, the storefront 910 incorporates a biometric sensor that receives biometric information from the user to confirm the user's identity. This same biometric information should be pre-stored in the datastore 130 so that the stored information can be compared with the information retrieved from the biometric sensor to confirm the user's identity.

In one example, a user device arrives at the fulfillment location 900 and crosses the pickup zone 930 when entering the pickup path 920. The user device sends heartbeat tokens 700 to the server 120, which shares the location information for this user device 110 with the fulfillment location processing engine 902 at the fulfillment location 900. Upon arriving at a pickup location 922, a biometric sensor receives biometric information from the user. Fulfillment location processing engine 902 then confirms the user biometric information and that the user device 110 is at the pickup location 922 before triggering the completion of the payment transaction.

In another embodiment, the fulfillment location equipment takes an image of the user at the pickup location 922 using camera 950. This image is then used to confirm the user's identity. The image analysis may recognize a user's face or fingerprint, or read a license plate on a vehicle, or even read a QR code presented by the user off of the user device 110. In the later example, the QR code would be presented by the user device 110 when the user device 110 detects that it is located at the pickup location 922. If the user is in a vehicle, and the user automotive device 114 is controlling the ordering process, the user automotive device 114 can present the QR code on the vehicle's user interface screen. Alternatively, in order to aid in the scanning of the QR code, the user automotive device 114 can communicate with the user portable device 112 to display the QR code. In yet another embodiment, the user automotive device 114 creates an audible signal of tones that are produced in a random-seeming pattern. These audible tones can be detected by a microphone at the storefront 910, and then compared to an expected signal (which is received by the fulfillment location processing engine 902 from the server 120) to confirm the identity of the user for the provision of their order.

In some embodiments, the user device 110 communicates directly with the fulfillment location 900 through the direct communication equipment 940 found at that fulfillment location 900. For example, the user device 110 may use encrypted 5G C-V2X Device to Device communication signal or an encrypted WiFi signal to establish connection with the direct communication apparatus 940. Through this communication channel, the user device can send a digitally signed non-repudiating registration to fulfillment location processing engine 902. The non-repudiating registration includes order detail information and the information contained in the heartbeat token 700. This digitally signed communication is proof of the user's identity, the user's location, and includes a timestamp. Fulfillment location processing engine 902 can then complete the payment transaction. In another embodiment, the user is simply prompted with a payment button on the user device 110 at a fulfillment location 140 where user interaction with the user device 110 ensures that the user paying for the ordered product is the same individual that is receiving the ordered product. Optionally, the user can pay at a POS system and NFC reader found at the storefront 910 adjacent the pickup location 922.

Geocells

As shown in FIG. 9, the fulfilment location 900 can divide the pickup path 920 into a plurality of location-defined geocells 924. Geocells 924 can be any shape to meet the requirement of the physical layout of the pickup path 920 of the fulfillment location 900. The geocells 924 are shown in FIG. 9 as having a generally rectangular shape. The size of each geocell 924 is generally defined such that only a single user device 110 (such as a user automotive device 114) will be located within each geocell 924. Geocells 924 are particularly useful when a plurality of user automotive devices 114 form a queue at the fulfillment location 900 to reach the pickup location 922 (although other types of user devices 110 can also be monitored via geocells 924). In FIG. 9, each geocell 924 is numbered, with the first entered geocell 924 being labeled with the number 1, and the last geocell 924 (at the pickup location 922) is labeled with the number 6.

To determine if a user is inside a geocell 924, the fulfillment location processing engine 902 uses lookup tables in a database or flat files that contain GPS positions that define each geocell 924. Once a relatively precise location is determined for a user device 110, the fulfillment location processing engine 902 uses computational calculations to determine which geocell 924 contains that location. Alternatively, the geocells 924 can be determined by a single location point, or a small set of location points. The location of the user device is then compared to these location points to determine the nearest point, which then determines the appropriate geocell 924. In another embodiment, the geocell location of the user device 110 is determined using electronic sensors that serve as geomarkers for each geocell 924. One or more of these geomarker sensors is associated with each geocell 924. The geomarker sensors can receives signals directly from user devices 110 to determine which user device 110 is closest to the geomarker sensor.

The ordering of the geocells 924 is used by the fulfillment location processing engine 902 to arrange and build an order pick-up queue that establishes a sequential order. Automated delivery equipment, fulfillment location staff, or both use the order pick-up queue to deliver ordered items to the appropriate user device 110 at the correct time.

As can be seen in FIG. 9, geocell number 1 is closer than geocell number 3 from the storefront 910. If proximity to the storefront 910 were used to determine a pick-up queue, the user device 110 in geocell number 1 would be positioned to pick up an order from the storefront 910 before the user device 110 in geocell number 3. A distance-based queuing algorithm would therefore place customers out of order. Instead, by establishing a system of geocells 924 through which users drive on a pickup path 920, an appropriate pickup queue can be established. In other embodiments, the time that the user device 110 was identified as first entering the pickup path 920 is used to arrange the order of the pickup queue. In these embodiments, entering the first numbered geocell 924 (number 1) would be considered to constitute entering the pickup path 920. Note that if it were possible to enter the pickup path 920 at multiple entry points, the entering of any geocell 924 would constitute entering the pickup path 920.

The fulfillment location processing engine 902 identifies the particular geocell 924 currently occupied by the user devices 110 in the pickup path 920. In some embodiments, GPS data from satellites 102, which is used to create the location data 710 in a heartbeat token 700, can also be used in determining the geocell location of a user device 110 at the fulfillment location 900. However, in some scenarios this GPS data may not provide the level of detail necessary to determine a currently occupied geocell 924. To overcome this difficulty, the fulfillment location processing engine 902 can receive more exact location information from position identification sensors 960 installed at the fulfillment location 140. These sensors 960 may work in conjunction with signals generated by the user device 110, such as known signal triangulation systems that triangulate on wireless signals (such as a WiFi signal) generated by the user device 110. These wireless signals can be automatically generated by the user device 110 or may be triggered by the app operating on the device 110, such as through interaction with the direct communication channel 940.

By identifying the geocell 924 occupied by a plurality of user devices 110 in the pickup path 920, the fulfillment location processing engine 902 can sort the orders according to the queue order of the user devices 110 within the pickup path. In other embodiments, the visual camera 950 can track the location and movement of the user device 110 (such as a user automotive device 114) in the pickup path 920. Visual identification of license plates, and associations between the plate and the user in the datastore 130 is one method of accomplishing this. In this way, the fulfillment location 900 will ensure that the ordered products are picked up by the user of the appropriate user device 110.

As explained above, a user device 110 is understood to be entering the pickup path 920 when the user device 110 first enters a geocell 924, with the first geocell 924 being entered usually being the first geocell 924 (marked "1" in FIG. 9) in the pickup path. In some cases, high-speed fulfillment apparatus can produce an order in a matter of seconds, with some production equipment being able to create a beverage in 20 seconds). When these products are being ordered, it is possible to start production for an order when a user device 110 enters a geocell 924 of the pickup path 920 and still deliver product at the pickup location with zero wait time. In some cases, preliminary steps in creating an order may begin with a user device 110 entering the engagement zone 172 of a fulfillment location 140, with the finalization of the order beginning when the user device 110 enters the pickup path 920.

Geocell Method

Figure 10:
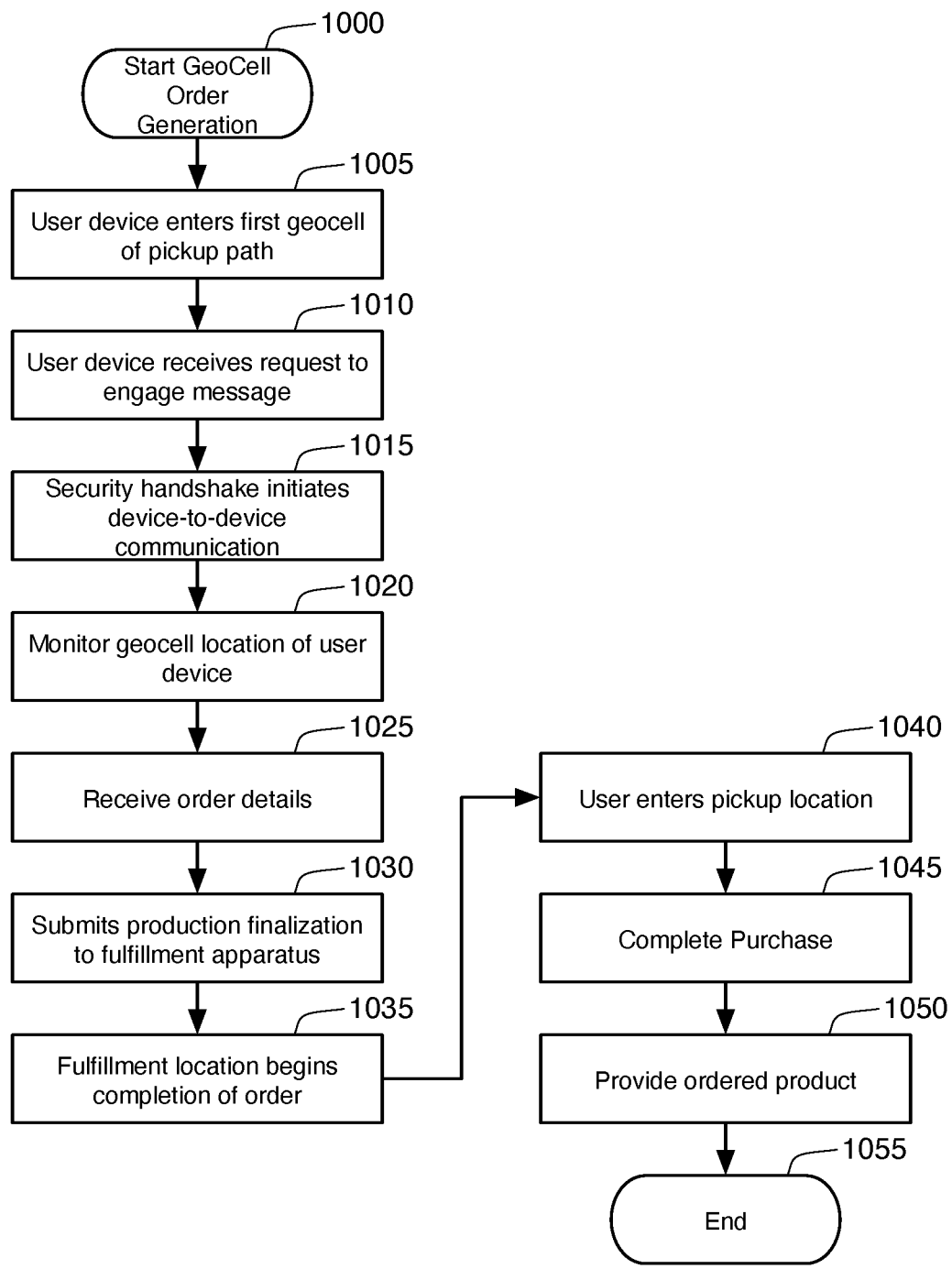
FIG. 10 is a flow chart showing a process for using the geocells of FIG. 9 for final product production and delivery.

FIG. 10 shows a method 1000 for generating and fulfilling an order using the geocells 924 of FIG. 9. In this method 1000, the engagement zone 172 and the production zone 174 can be disabled, as no order will be generated upon entering these zones 170. Instead, the fulfillment location processing engine 902 determines when a user device has approached the fulfillment location 900. This can be determined by defining a pickup zone 930 and monitoring a heartbeat signal from a user device 110. Alternatively, when the user device 110 approaches the fulfillment location 900 and enters the first geocell 924 of the pickup path 920 (step 1005), the user device 110 will come within range of a "request-to-engage" message that is periodically sent out by the direct communication apparatus 940 (step 1010). Upon detecting this message, the user device 110 will respond and enter into a security handshake with the fulfillment location processing engine 902 through the direct communication apparatus 940 (step 1015). This establishes a secure device-to-device communication session between the user device 110 and the fulfillment location 900. Note that in the context of a cluster as discussed above in connection with FIGS. 3-6 above, the detection of the user device 110 in this pickup path 920 can constitute a selection of a particular fulfillment location 140 in the same manner as entering a production zone, as shown above at step 535.

At step 1020, the fulfillment location processing engine 902 monitors the location of the user device 110, in particular determining the particular geocell 924 occupied by the user device 110. This can occur using the location sensors 960 described above. Alternatively, the user device 110 can send the heartbeat signal (using the heartbeat tokens 700) that include location information. This signal can be sent to the server 120, which then communicates with the fulfillment location processing engine 902 over the network 104. Alternatively, the heartbeat signal can be transmitted directly to the fulfillment location processing engine 902 over the direct communication apparatus 940. Heartbeat tokens 700 received from a user device 110 when the user is within the pickup path 920 can be used to confirm the location of the user device 110 and the user's identity. In some embodiments, the heartbeat token 700 itself might include order information, particularly in the context of a user device 110 within a geocell 924.

In addition to monitoring the geocell location of the user device 110, the initiation of communications at step 1015 also triggers the sending of an order to the fulfillment location processing engine 902. As explained above, the server 120 is able to analyze past purchase behavior of the user, along with time of day, day of week, month, weather, and similar information in order to identify the appropriate order from the user. As a result, when the fulfillment location processing engine 902 establishes communication with the user device 110, the fulfillment location processing engine 902 can also request that the server 120 send it an appropriate order. There is no need to determine whether or not the selected order is appropriate to generate (step 220), because the user device has entered the pickup path 920 and the system 100 can be confident that an ordered product is desired. The server 120 determines the content of the order and transmits it to the fulfillment location processing engine 902 at step 1025. Optionally, the server 120 can then present the determined order to the user device 110 for confirmation through the device's user interface. In this optional context, only after confirmation (or a failure by the user to cancel or correct the order presented via the use interface after a set amount of time), does the server 120 communicate a specific order to the fulfillment location processing engine 902 at step 1025. In other embodiments, the fulfillment location processing engine 902 communicates directly with the user device 110, asking the user device 110 to provide an order at step 1025. The user device 110 can apply its only logic, or request assistance from the server 120, or even simply ask the user through its interface to determine the appropriate order contents.

When the order has been received, the fulfillment location processing engine 902 submits the order to the fulfillment apparatus 160 at step 1030. This submission is a request to create the final ordered product, as there is no need to create only the first portion of the product as the user device 110 is already at the fulfillment location 900. In another scenario, pre-made sharable sub-product (described below) may be done and ready for any user. Entering the pickup path 920 triggers production finalization at step 1030 (at module 2 equipment 164) to complete rest of the product. Next, the fulfillment apparatus 160 will produce the ordered product (step 1035). In cases where sharable components are pre-made by the modular equipment 162, 164, 166, the components are retrieved from the unique staging area that stores those components, and the fulfillment apparatus 160 uses those components to produce the ordered product. When the fulfillment location processing engine 902 determines that the user device 110 is at the pickup location 922 (step 1040), the user will be able to complete the purchase at step 1045. As explained above, this step 1045 can be fully automated using biometric or other identification technologies to ensure that it is the user of the ordering user device 110 that is at the pickup location 922. Information from the user's heartbeat 700 (their location 710, identifier 720, and timestamp 730) and from any local camera 950 will be stored along with the transaction details. Once the purchase is complete, the ordered product is provided at step 1050, and the method 1000 ends at step 1055.

The methods described above were associated with processing performed at the fulfillment location 900 by the fulfillment location processing engine 902. However, some or all of this processing can occur at the server 120, with the results of that processing being transmitted to the fulfillment location 900 over network 104.

GeoGrid (Sweet Spots)

Figure 11:
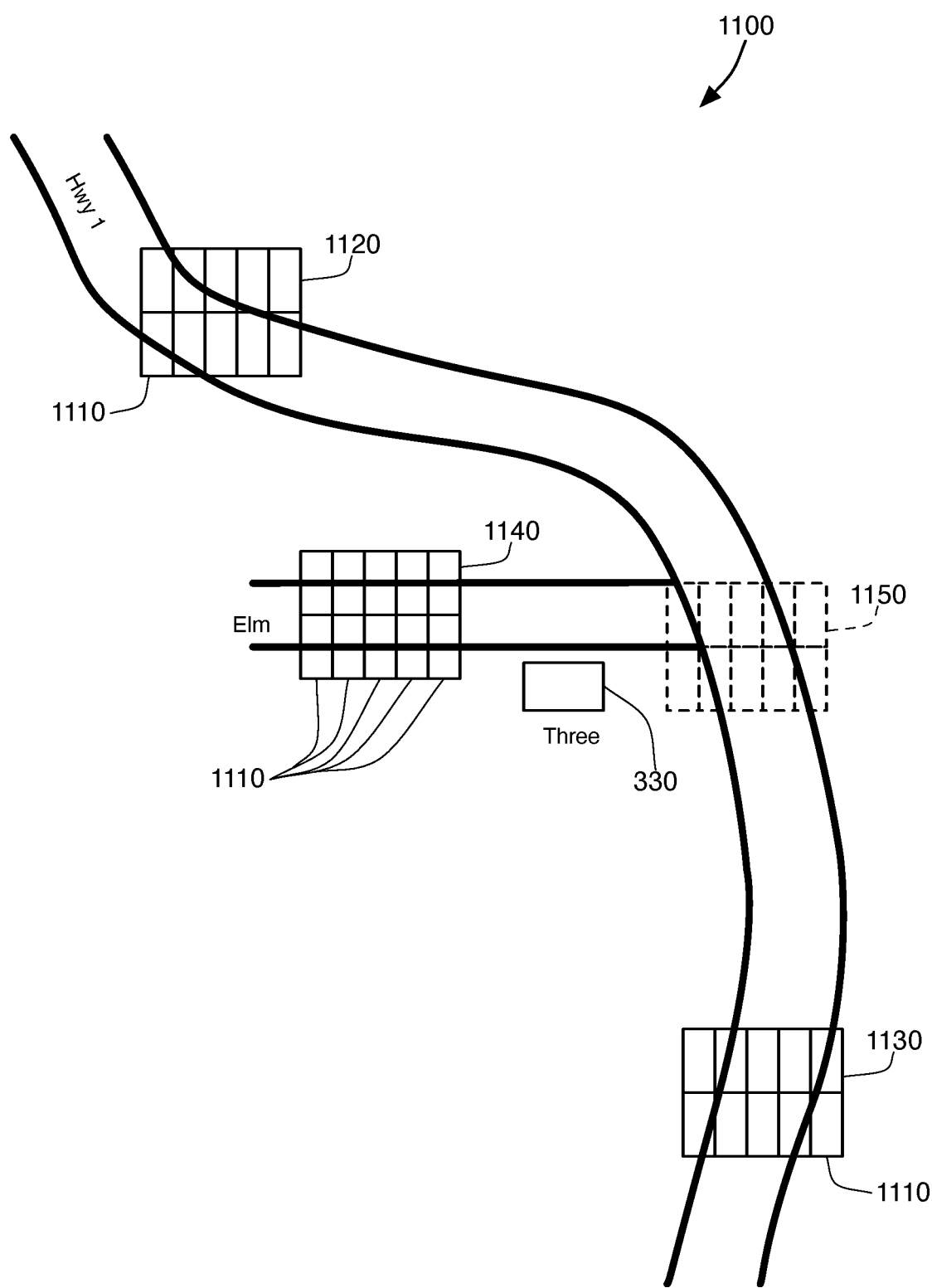
FIG. 11 is a schematic view of a fourth system for identifying selected fulfillment locations.

FIG. 11 shows an alternative technique for forming engagement zone 333 and production zone 334 for fulfillment location 330. Rather than defining these zones 333, 334 as a fixed geographic shape, or a flexible shape based on current estimated time-to-arrival values, the system 1100 of FIG. 11 shows a first geogrid 1120, a second geogrid 1130, and a third geogrid 1140 (also known as sweet spots), each along one of the three natural paths (roadways) leading to fulfillment location 330. Each of these geogrids 1120, 1130, 1140 is made up of a plurality of rectangular shaped regions 1110.

In at least one embodiment, the size and location of these regions 1110 is determined by the geographic location coordinates used by the system. For example, GPS coordinates returned by a standard GPS system provides the location of a GPS antenna in degrees, minutes, and decimal minutes. One minute of latitude is 6,068 feet. The first position after the decimal (the tenths position) is therefore about 607 feet, the second position is about 60.7 feet, and the third position is about 6 feet. The third decimal position therefore provides sufficient accuracy for most GPS systems. The regions 1110 can be defined by rounding the GPS coordinates down to one or two decimal positions. If the second decimal position is used, the vertical length of each region 1110 shown in FIG. 11 would be determined by the change in the hundredth (second) decimal position of the minutes of latitude, meaning that each region 1110 would have a length of approximately 60 feet. The horizontal length of each region 1110 would depend on the latitude. At approximately 38 degrees North latitude, each second decimal position change create a length of 48 feet.

Each rectangular region 1110 is therefore designated by a single position that identifies a location to the correct decimal precision. A location (in DD MM.MM), such as 36 34.02 (N), 121 54.16 (W), defines one exact coordinate, which can be considered one corner of a particular region 1110. All other exact coordinates that round down at the second decimal to the same coordinates would be located within the defined, rectangular region 1110. By defining regions 1110 in this manner, it is possible to perform a simple comparison to determine whether or not a particular GPS location is wherein a region 1110. If one was concerned with whether a position is found within a plurality of regions 1110, such as the first geogrid 1120, the position is rounded down to the second decimal of minutes, and then compared to a list of defined regions 1110 in the first geogrid 1120. If the rounded down position exactly matches a position that define a corner of one of the regions 1110 in the first geogrid 1120, the position will be known to exist in the first geogrid 1120.

Some GPS systems will return longitude and latitude in decimal degrees, such as 36.56694 (N), 121.901944 (W). The same construction of regions 1110 can be created by rounding down these coordinates to particular decimal values. For instance, rounding this type of coordinate down to 3 decimal places will cover an area of about 364.56 feet by 364.56 feet at the equator. A system 1100 that defines regions 1110 by rounding down decimal values in a GPS coordinate can utilize degree decimals, minute decimals, or even second decimals. Alternatively, a whole second of longitudinal or latitudinal change, which is less than 101 feet in length, can also be used to define a region 1110.

Once the system for defining regions 1110 is established, geogrids 1120, 1130, 1140 can be created by defining a contiguous grouping of regions 1110. The first geogrid 1120 defines an area on Hwy 1 north of Elm Street. When a user enters any of the regions 1110 in the first geogrid 1120, the user can be considered to have entered the geogrid 1120. In one embodiment, entering the first geogrid 1120 constitutes the equivalent of passing into engagement zone 333 of the third fulfillment location 330, as shown in FIG. 3. A second geogrid 1130 is defined on Hwy 1 south of Elm Street. Similarly, if a user enters any of the regions 1110 in the second geogrid 1130, they will be treated as having entered the engagement zone 333. The third road leading to fulfillment location 330 is Elm Street itself, and third geogrid 1140 is defined to cover approaches to the third fulfillment location 330 from the west on Elm Street.

In effect, these geogrids 1120, 1130, 1140 define sweet spots on the known paths that approach the third fulfillment location 330. The sweet spots are not based upon a physical shape that surrounds the third fulfillment location 330, nor are they based upon estimated times-to-arrival. Rather, they are merely locations on known routes that can be used to trigger pre-production much like the engagement zone 333. Trial and error can be used to adjust the locations of the geogrids 1120, 1130, 1140, especially if use shows them to trigger pre-production too early or too late. The locations of these sweet spots can also vary from day to day, depending on the day of the week, the current month, the weather, holidays, or other similar, repeating and predictable events that might alter the ideal placement of these sweet spots.

Fourth geogrid 1150 is placed on Hwy 1 closer to the third fulfillment location 330. As such, the fourth geogrid 1150 can be used in place of the closer production zone 334 for the third fulfillment location 330. When vehicles traveling along Hwy transmit their GPS location to the server 120, the server 120 can round their identified location values to determine whether the current location is within the first geogrid 1120 or the second geogrid 1130. If it is, it can trigger preproduction of a determined order at the third fulfillment location 330 in the same way as passing through engagement zone 333. Such preproduction can include the pre-making of shareable components. When the server 120 notices that the vehicle's current location is within the fourth geogrid 1150, full production of the order can begin at the fulfillment location 330. To ensure ordered product is ready when user arrived at fulfillment location 330, the placement of geogrid is fine-tuned with historical data such as geogrid location, size of order, order completion time and user pickup time, time of day, day of week, day of month, month of year, public holiday. Geogrid are fine-tuned and saved in datastore 130 for future use.

In some embodiments, the different regions 1110 of a geogrid 1120-1150 can perform different functions. For instance, the right-hand portion of the third geogrid 1140 is positioned close enough to the third fulfillment location 330 so that the regions 1110 in this portion can serve the same purpose as the fourth geogrid 1150. In other words, the regions 1110 on the left-hand portion of the third geogrid 1140 function similar to the engagement zone 333 when entered, while the regions 1110 on the right-hand portion of the third geogrid 1140 function similar to the production zone 334 when entered. In effect, the first geogrid 1120, the second geogrid 1130, and the left-hand portion of the third geogrid 1140 comprise engagement geogrids, while the right-hand portion of the third geogrid 1140 and the fourth geogrid 1150 comprises production geogrids.

The many features and advantages of the invention are apparent from the above description. Numerous modifications and variations will readily occur to those skilled in the art. Since such modifications are possible, the invention is not to be limited to the exact construction and operation illustrated and described. Rather, the present invention should be limited only by the following claims.

What is claimed is:
1. A method comprising:
a) at a first device, wherein the first device is selected from a set consisting of a mobile device and an automotive computing device, wherein the automotive computing device comprises a computerized system that forms part of a mobile vehicle and is capable of running applications to perform specific functions, the first device generating a plurality of heartbeat tokens by:
 i) receiving from a GPS device associated with the first device a GPS location comprising a current longitude value and a current latitude value,
 ii) embedding the GPS location into the heartbeat token,
 iii) embedding a user identifier into the heartbeat token, and
 iv) embedding a timestamp into the heartbeat token;
b) transmitting, from the first device, a set of heartbeat tokens at intervals as a heartbeat signal, wherein when the first device is stationary the heartbeat tokens are sent at a first interval, and further wherein when the first device is moving, the heartbeat tokens are sent at a second interval faster than the first interval;
c) at a server, receiving the heartbeat signal from a first device, the heartbeat signal identifying a physical location for the first device based on the GPS locations in the heartbeat tokens and identifying a user of the first device based on the user identifier found in the heartbeat tokens;
d) at the server, identifying a plurality of fulfillment locations, wherein each fulfillment location is capable of at least partial automated processing;
e) at the server, identifying a first subset of fulfillment locations based upon the physical location for the first device identified by the heartbeat signal, the first subset of fulfillment locations comprising more than one fulfillment location, wherein a non-selected fulfillment location is not part of the first subset of fulfillment locations;
f) at the server, identifying an order for the first device;
g) at the server, transmitting the order to each of the first subset of fulfillment locations to cause each of the first subset of fulfillment locations to initiate automated processing of the order;
h) identifying a selected fulfillment location, wherein the first subset of fulfillment locations includes the selected fulfillment location and a non-selected sub-subset of fulfillment locations;
i) at the server, transmitting instructions to terminate the automated processing to the non-selected sub-subset of fulfillment locations before completion of automated processing; and j) at the server, transmitting instructions to complete processing the order to the selected fulfillment location to generate a desired product.

2. The method of claim 1, wherein the selected fulfillment location is identified by:
   i) at the server, transmitting identification information and availability information for the first subset of fulfillment locations to the first device,
   ii) presenting the availability information for the first subset of fulfillment locations through a user interface provided by the first device,
   iii) receiving a selection of the selected fulfillment location through the user interface, and
   iv) at the server, receiving from the first device a selection of a selected fulfillment location, wherein the first subset of fulfillment locations includes the selected fulfillment location and a non-selected sub-subset of fulfillment locations.

3. The method of claim 1, wherein the selected fulfillment location performs the processing utilizing modular production equipment that performs the automated processing in separate steps to generate the desired product, wherein all steps are performed automatically without human intervention.

4. The method of claim 1, wherein:
   each of the first subset of fulfillment locations initiate automated processing of the order by generating a first reusable component, and then await receipt of the instructions to complete the processing of the order after generating the first reusable component;
   further wherein the non-selected sub-subset of fulfillment locations reuse the first reusable component in other orders after receiving the instructions to terminate the automated processing; and
   further wherein the selected fulfillment location uses the first reusable component to generate the desired product.

5. The method of claim 1, wherein:
   i) a first fulfillment location captures a snapshot of user devices for which it is in a device cluster,
   ii) the first fulfillment location predicts future sales within an immediate-future time based on the snapshot of user devices and historical data,
   iii) the first fulfillment location generates a plurality of reusable components based on a prediction of future sales within the immediate-future time,
   iv) the first fulfillment location receives the instructions to complete processing the order of a particular order,
   v) the first fulfillment location selects a particular reusable component from the plurality of reusable components leaving unselected remaining reusable components, and the first fulfillment location uses the particular reusable component to complete the particular order, and
   vi) the remaining reusable components await additional completion instructions.

6. The method of claim 5, wherein the prediction of future sales is based upon a prior training of a machine learning artificial intelligence algorithm.

7. The method of claim 1, wherein the server identifies the first subset of fulfillment locations by comparing the physical location for the first device to engagement zones defined for the plurality of fulfillment locations, wherein the physical location for the first device is within the engagement zones of the first subset of fulfillment locations.

8. The method of claim 7, wherein:
   i) the first subset of fulfillment locations does not include a first fulfillment location at a first time when the physical location for the first device is not within a first engagement zone for the first fulfillment location,
   ii) the first fulfillment location is added to the first subset of fulfillment locations at a second time when the physical location for the first device moves within the first engagement zone for the first fulfillment location, and
   iii) the first fulfillment location is removed from the first subset of fulfillment locations at a third time when the physical location for the first device moves outside the first engagement zone for the first fulfillment location.

9. The method of claim 7, wherein the selected fulfillment location is identified by:
   i) at the server, transmitting identification information and availability information for the first subset of fulfillment locations to the first device,
   ii) presenting the availability information for the first subset of fulfillment locations through a user interface provided by the first device, and
   iii) at the server, receiving from the first device a selection of the selected fulfillment location, wherein the first subset of fulfillment locations includes the selected fulfillment location and a non-selected sub-subset of fulfillment locations.

10. The method of claim 9, wherein the first device is the automotive computing device.

11. The method of claim 7, wherein the selected fulfillment location is identified by comparing the physical location for the first device to production zones defined for the first subset of fulfillment locations, wherein the physical location for the first device is within a selected production zone of the selected fulfillment location.

12. The method of claim 11, wherein the engagement zones and the production zones for the fulfillment locations are defined according to time-to-travel data associated with the physical location for the first device with respect to the fulfillment locations.

13. The method of claim 11, wherein the engagement zones and the production zones for the fulfillment locations are defined according to distances from the physical location for the first device.

14. The method of claim 7, wherein the selected fulfillment location is identified by comparing the physical location for the first device to pickup zones defined for the first subset of fulfillment locations, wherein the physical location for the first device is within a selected pickup zone of the selected fulfillment location, wherein the pickup zones are each identified by a plurality of geocells.

15. The method of claim 1, wherein the server identifies the first subset of fulfillment locations by comparing physical locations for the plurality of fulfillment locations to a cluster radius for the first device, wherein the physical locations for each of the first subset of fulfillment locations is within the cluster radius for the first device.

16. The method of claim 15, wherein:
   i) the first subset of fulfillment locations does not include a first fulfillment location at a first time when the cluster radius for the first device does not include a first physical location for the first fulfillment location,
   ii) the first fulfillment location is added to the first subset of fulfillment locations at a second time after the cluster radius for the first device moves to include the first physical location for the first fulfillment location, and
   iii) the first fulfillment location is removed from the first subset of fulfillment locations at a third time when the cluster radius for the first device moves to no longer include the first physical location for the first fulfillment location.

17. The method of claim 1, wherein the server identifies the first subset of fulfillment locations by:
comparing the physical location for the first device to engagement geogrids defined for the plurality of fulfillment locations,
wherein each geogrids defines a plurality of rectangular regions, wherein each of the plurality of rectangular regions is defined by rounding down a GPS coordinate at a known decimal value,
rounding GPS coordinates of the physical location for the first device at the known decimal value to create rounded GPS coordinates of the physical location, and
comparing the rounded GPS coordinates of the physical location for the first device to the plurality of rectangular regions for the engagement geogrids of the plurality of fulfillment locations.

18. The method of claim 17, wherein the selected fulfillment location is identified by comparing the rounded GPS coordinates of the physical location for the first device to production geogrids defined for the first subset of fulfillment locations, wherein the physical location for the first device is within a selected production geogrid of the selected fulfillment location.

19. The method of claim 1, wherein the first device is the automotive computing device, further comprising:
establishing communication between the automotive computing device and a mobile device;
transferring responsibility for sending the heartbeat signal from the automotive computing device to the mobile device; and
receiving at the server the heartbeat signal from the mobile device, the heartbeat signal identifying the physical location for the mobile device;
wherein the server identifies the first subset of fulfillment locations by comparing the physical location for the mobile device to engagement zones defined for the plurality of fulfillment locations, wherein the physical location for the mobile device is within the engagement zones of the first subset of fulfillment locations.

20. The method of claim 1, further comprising:
at the server, identifying a pickup path, the pickup path comprising an ordered set of geocells, each geocell defining a distinct geographic area, the ordered set of geocells being contiguous, the pickup path terminating at a pickup location geocell;
at the server, identifying that the physical location for the first device has entered the pickup path;
at the server, identifying a first ordered product for the first device;
at the server, identifying that a second device has entered the pickup path at a second geocell and identifying a second ordered product for the second device,
at the server, establishing a sequential order that indicates that the first device is ahead of the second device by comparing geocells occupied by the first device and the second device;
presenting the first ordered product when the server identifies that the first device has entered the pickup location geocell; and
presenting the second ordered product when the server identifies that physical location for the second device has entered the pickup location geocell.

21. A method comprising:
a) at a server, receiving a heartbeat signal transmitted by a first device, wherein the first device is selected from a set consisting of a mobile device and an automotive device, wherein the automotive device comprises a computerized system that forms part of a mobile vehicle and is capable of running applications to perform specific functions, the heartbeat signal identifying a physical location for the first device and identifying a user of the first device, wherein with each heartbeat signal comprises a plurality of heartbeat tokens created at the first device by:
 i) receiving from a GPS device associated with the first device a GPS location comprising a current longitude value and a current latitude value,
 ii) embedding the GPS location into the heartbeat token,
 iii) embedding a user identifier into the heartbeat token, and
 iv) embedding a timestamp into the heartbeat token;
b) at the server, identifying a plurality of fulfillment locations, wherein each fulfillment location is capable of at least partial automated processing;
c) at the server, identifying a first subset of fulfillment locations based upon the physical location for the first device identified by the heartbeat signal, wherein a second fulfillment location is not part of the first subset of fulfillment locations;
d) at the server, identifying an order for the first device; and
e) at the server, transmitting the order to each of the first subset of fulfillment locations to cause each of the first subset of fulfillment locations to initiate automated processing of the order;
f) identifying a selected fulfillment location, wherein the first subset of fulfillment locations includes the selected fulfillment location and a non-selected sub-subset of fulfillment locations;
g) at the server, transmitting instructions to terminate the automated processing to the non-selected sub-subset of fulfillment locations before completion of automated processing; and
h) at the server, transmitting instructions to complete processing the order to the selected fulfillment location to generate a desired product;
j) at the server, tracking a physical location of the second device by identifying the GPS locations within the first set of heartbeat tokens;
k) at the server, tracking a physical location of the second device by identifying the GPS locations within the first set of heartbeat tokens;
l) next, at the server, requesting a first change in heartbeat frequency from the second device; and
m) next, at the second device, periodically transmitting a second set of heartbeat tokens to the server at a second frequency that is faster than the first frequency.

* * * * *